(12) United States Patent
Yu et al.

(10) Patent No.: US 11,757,987 B2
(45) Date of Patent: Sep. 12, 2023

(54) LOAD BALANCING SYSTEMS AND METHODS

(71) Applicant: Telefonaktiebolaget LM Ericsson (publ), Stockholm (SE)

(72) Inventors: LuSheng Yu, Täby (SE); Lin Yang, Täby (SE); Tomas Nylander, Värmdö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 20 days.

(21) Appl. No.: 17/607,685

(22) PCT Filed: Apr. 30, 2019

(86) PCT No.: PCT/SE2019/050386
§ 371 (c)(1),
(2) Date: Oct. 29, 2021

(87) PCT Pub. No.: WO2020/222683
PCT Pub. Date: Nov. 5, 2020

(65) Prior Publication Data
US 2022/0232071 A1 Jul. 21, 2022

(51) Int. Cl.
*H04L 67/1034* (2022.01)
*H04L 47/125* (2022.01)

(52) U.S. Cl.
CPC ........ *H04L 67/1034* (2013.01); *H04L 47/125* (2013.01)

(58) Field of Classification Search
CPC ............... H04L 67/1034; H04L 47/125; H04L 41/0663; H04L 67/14; H04L 67/148; G06F 11/2025; G06F 11/2028
See application file for complete search history.

(56) References Cited

U.S. PATENT DOCUMENTS 7,702,791 B2 4/2010 Halpern et al.
10,149,333 B2 12/2018 Jiang et al.
(Continued)

FOREIGN PATENT DOCUMENTS

WO 2018/175864 A1 9/2018

OTHER PUBLICATIONS

International Search Report and Written Opinion dated Nov. 8, 2019 in International Application No. PCT/SE2019/050386 (8 pages total).

(Continued)

*Primary Examiner* — Johnny B Aguiar
(74) *Attorney, Agent, or Firm* — Rothwell, Figg, Ernst & Manbeck, P.C.

(57) ABSTRACT

A fault tolerance solution for a multi-layer cloud system. The embodiments of this disclosure are applicable to radio access network (RAN) application area as well as cloud environment with virtual machine or container-based application function implementation. In one aspect there is a method performed by a load balancing system, which method includes: receiving a request sent by a client and selecting from a first cluster of serving entities a first main serving entity and a first backup serving entity. The method also includes, as a result of receiving the request sent by the client, sending to the client information identifying the selected first main serving entity and the selected first backup serving entity.

15 Claims, 16 Drawing Sheets

(56) References Cited

U.S. PATENT DOCUMENTS

| | | | | |
|---|---|---|---|---|
| 2003/0005350 A1* | 1/2003 | Koning | ............... | H04L 69/40 |
| | | | | 714/4.11 |
| 2003/0014480 A1* | 1/2003 | Pullara | ............... | H04L 67/1027 |
| | | | | 714/E11.08 |
| 2008/0301489 A1* | 12/2008 | Li | ............... | G06F 11/2041 |
| | | | | 714/4.12 |
| 2013/0007505 A1* | 1/2013 | Spear | ............... | G06F 11/2025 |
| | | | | 714/4.11 |
| 2013/0031403 A1* | 1/2013 | Mordani | ............ | G06F 11/2041 |
| | | | | 714/E11.073 |
| 2013/0054781 A1* | 2/2013 | Yan | ............... | G06F 11/2038 |
| | | | | 709/224 |
| 2014/0280470 A1* | 9/2014 | Calo | ............... | H04L 69/16 |
| | | | | 709/203 |

OTHER PUBLICATIONS

Apache Tomcat 8, Version 8.0.53, Jun. 29, 2018, "Clustering/Session Replication HOW-TO", (8 pages total).

Session Replication, Sun Java System Web Server 7.0 Update 7 Administrator's Guide, 2010, Oracle Corporation, (3 pages total).

* cited by examiner

11,757,987 B2

LOAD BALANCING SYSTEMS AND METHODS

CROSS REFERENCE TO RELATED APPLICATION

This application is a 35 U.S.C. § 371 National Stage of International Patent Application No. PCT/SE2019/050386, filed Apr. 30, 2019.

TECHNICAL FIELD

Disclosed are embodiments related to load balancing systems and methods.

BACKGROUND

As cloud technologies are introduced in the 5th generation (5G) Radio Access Network (RAN), many functions will be implemented in the cloud and on a cluster of computers, virtual machines, or containers, where each computer, virtual machine, or container could be an entity in the cluster.

In the cluster, many entities implement the same function and this provides scalability to a service. For example, when system load increases above a threshold, new entities can be added to the cluster, thereby increasing the capacity of the cluster. On the other hand, when the system load decreases, existing entities can be removed to save resources. This is a normal virtualization technique to scale out/in a system. In this kind of system, when a client sends a request, a load balancer will select one entity in the cluster and then route the request to the entity.

There are many applications which require session data (a.k.a., context data) for providing a service. In those applications, there will be multiple interactions between a client and a server for the service. For example, a user may log in first, access some information, and then update some information. This is called a stateful service. A stateful service requires the actual service provider to keep the session data for further service interactions. In a wireless communication system, RAN applications in the cloud often provide this kind of stateful service.

One way to provide a stateful service for normal web applications is to make a session "sticky." In the "sticky" session, a load balancer will always route the following interactions of the session to the same entity according to session identifier (ID)/key because that entity has context information of that session. Currently, implementations for stateful service in 5G testbeds are using solution(s) which are similar to the sticky session solution.

Even though a sticky session is one way to provide a stateful service in a cloud cluster environment, it does not provide any fault tolerance. For example, when an entity malfunctions (e.g., no response from the entity) or is in an over-loaded state (e.g., high central processing unit (CPU) load, high disk usage, long response time, etc.), the session or context information on that entity might be lost and other entities might not be able to help to failover.

One of the fault tolerance solutions for web applications is session data replication across entities in a cluster. In such a fault tolerance solution, when one entity fails during a session, a load balancer will re-route the following requests of the same session to another entity and the failover entity will obtain replicated session data such that the service of the session can be continued. This kind of mechanism can be found in APACHE TOMACT™ and SUN JAVA SYSTEM™ web server, etc.

Another fault tolerance solution is to save the session data into some persistent data storage (e.g., database which also has some redundancy support). Example(s) of such solution are described in U.S. Pat. No. 10,149,333.

Another fault tolerance solution is described in the International Patent Publication WO 2018/175864 A1. This solution is similar to the previous solution which saves the session data into some persistent storage medium. In this solution, if one entity fails, a new container will be created as a failover entity while session data will be migrated from a persistent storage medium and original Internet protocol (IP) address will be maintained to save the downtime.

SUMMARY

For 5G RAN application, fault tolerance should be provided.

Even though session data replication in a cluster provides fault tolerance solution to stateful services, it is not good enough for multi-layer applications. For example, assume that there is a three-layer system having a first layer with entities serving an external client, a second layer with entities serving the first layer, and a third layer with entities serving the second layer, where the first layer is also a client to the second layer and the second layer is also a client to the third layer. Every messages related to a session are rerouted by a load balancer to a previously selected entity (i.e., making the session "sticky").

A sticky session with replication provides a possibility for redundancy in the direction from the first layer entity to the second layer entity and from the second layer entity to the third layer entity. In other words, if the load balancer is aware of that a previously selected entity in a serving layer/side (i.e., the subsequent layer) is no longer available, the load balancer can select another entity on the serving layer/side.

On the other hand, a service response from a server (e.g., an entity in the third layer) to a client (e.g., an entity in the second layer) cannot be re-routed to a backup client entity (e.g., another entity in the second layer) because the server does not have information about the backup client entity. Therefore, the above described sticky session with replication does not provide a way to failover the failed client entity to proceed the service responses in the reverse direction. For example, if a previously selected entity in the second layer is unavailable, a service response from an entity in the third layer entity cannot be handled properly.

In persistent data storage approach, session data will be saved into a database or some other data storage such as a memory. The approach gives the flexibility to choose entities to continue the service for a session when an original entity is unavailable, by loading the session data from the persistent data storage. But this approach will introduce extra time for saving data to and fetching data from the persistent data storage. Also it does not solve the aforementioned problem with respect to multi-layer applications.

The embodiments of this disclosure provide a better fault tolerance solution for a multi-layer cloud system. The embodiments of this disclosure are applicable to RAN application area as well as cloud environment with virtual machine or container-based application function implementation.

Accordingly, in one aspect there is a method performed by a load balancing system. In one embodiment, the method includes receiving a request sent by a client and selecting from a first cluster of serving entities a first main serving entity and a first backup serving entity. The method also includes, as a result of receiving the request sent by the client, sending to the client information identifying the selected first main serving entity and the selected first backup serving entity.

In other aspect there is a method performed by a client. In one embodiment, the method includes sending a request to a load balancing system. The method also includes as a result of sending the request to the load balancing system, receiving information identifying a first main serving entity that is a part of a first cluster of serving entities and a first backup serving entity that is a part of the first cluster of serving entities. The information is sent by the load balancing system. The method further includes after receiving the information identifying the first main serving entity and the first backup serving entity, sending to the first main serving entity information identifying the first backup serving entity.

In other aspect there is a method performed by a first main serving entity within a first cluster of serving entities. In one embodiment, the method includes receiving first identifying information identifying a first backup serving entity within the first cluster of serving entities. The first identifying information is sent by a client. The method also includes after receiving the first identifying information, sending a request to a load balancing system and as a result of sending the request to the load balancing system, receiving second identifying information identifying a second main serving entity within a second cluster of serving entities and a second backup serving entity within the second cluster of serving entities. The second identifying information is sent by the load balancing system. The method further includes after receiving the second identifying information, sending to the second main serving entity third identifying information identifying the first main serving entity, the first backup serving entity, and the second backup serving entity.

In other aspect there is a method performed by a second main serving entity. In one embodiment, the method includes receiving first identifying information identifying the first main serving entity, a first backup serving entity, and a second backup serving entity. The first identifying information is sent by a first main serving entity. The method also includes after receiving the first identifying information, sending a request to a load balancing system and as a result of sending the request to the load balancing system, receiving second identifying information identifying a third main entity and a third backup entity. The second identifying information is sent by the load balancing system. The method further includes after receiving the second identifying information, sending to the third main serving entity third identifying information identifying the second main serving entity, the second backup serving entity, and the third backup serving entity. Each of the first main serving entity and the first backup serving entity is selected from a first cluster of serving entities and each of the second main serving entity and the second backup serving entity is selected from a second cluster of serving entities. Also each of the third main serving entity and the third backup serving entity is selected from a third cluster of serving entities.

BRIEF DESCRIPTION OF THE DRAWINGS

The accompanying drawings, which are incorporated herein and form part of the specification, illustrate various embodiments.

DETAILED DESCRIPTION

Figure 1:
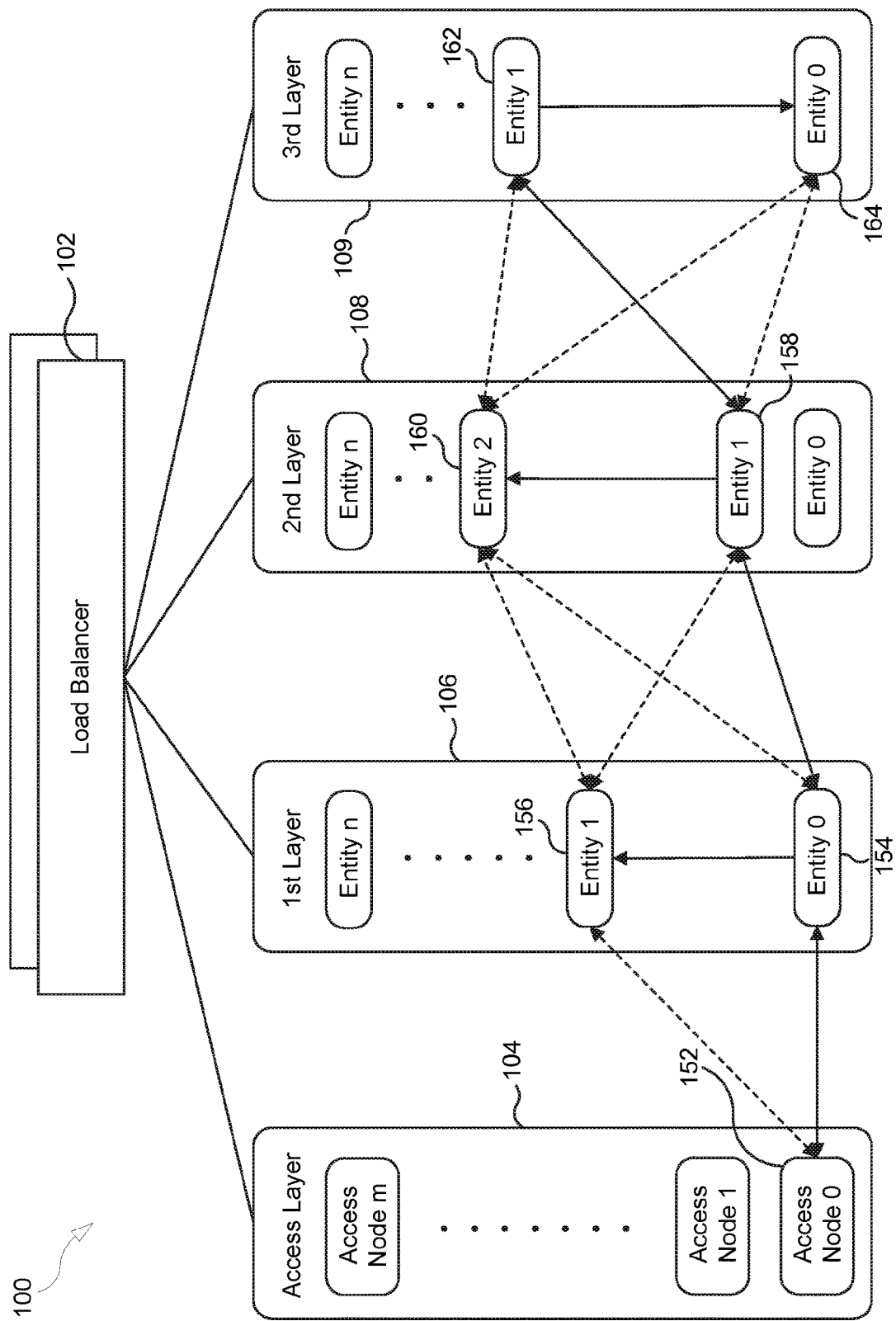
FIG. 1 illustrates a system according to some embodiments.

The embodiments of this disclosure solve the problems of the conventional fault tolerance solutions. For example, in one embodiment the following two features are employed: first, load balancing is done only when a session is setting up (once the session is set up, further exchange of information on the session may be sent and/or routed to a serving entity directly); and second, to avoid introducing time delay when restoring session for another entity session data replication is performed in limited scope. When a request for a new session is received, a load balancer will choose one entity as main serving entity and one or more entities as backup serving entities. Then the main serving entity will perform the session data replication to the backup serving entities. This method achieves a redundancy and at the same time minimizes the load needed for context replication (i.e., balancing between having only one serving entity (thus providing no fault tolerance) and performing a full cluster backup (i.e., session data with packet flooding)).

In the embodiments of this disclosure, to support a multi-layered distributed stateful system (for example, a cloud RAN system) in both forward and backward directions, each serving layer is configured to maintain information about serving entities in both directions. For example, a second (e.g., a middle) layer may be configured to know a main serving entity and one or more backup serving entities in both first and third serving layers and thus a redundancy can be achieved in both directions.

Compared to current implementations, the embodiments of this disclosure provide fault tolerance, which is necessary for some applications such as 5G cloud RAN. Also, the embodiments of this disclosure allow smoother operation/management and potentially easier design because a virtual machine hosting serving entity can be taken out of operation without the need to migrate all current sessions on that virtual machine and the current sessions can be continued with one or more backup entities.

In the conventional fault tolerance solutions, tracking backup serving entities for each layer allows entities on a layer to find backup serving entities on the subsequent layer such that a session request may be sent to the backup serving entities when the main serving entity becomes unavailable. But the conventional solutions do not provide fault tolerance when a client entity in a layer is unavailable and a server entity in an adjacent layer (e.g., an entity in the third layer) wants to send a response message to the unavailable client entity.

Embodiments of this disclosure solve the aforementioned problem of the conventional solutions by tracking backup entities in in adjacent layers (forward and backward). This provides much improvement for some applications such as, for example, RAN applications, as there are some procedures that involve many interactions across many layers. In those applications, when a response is missed, the whole procedure needs to be re-executed from the beginning, and thus the cost for redoing the procedure is much higher.

FIG. 1 is a logical structure diagram for a multi-layer cloud system 100 providing fault tolerance solution according to some embodiments. FIG. 1 shows an access layer 104 which includes a plurality of access nodes. Each access node may act as a client of the cloud system 100. In RAN applications, each access node may be a radio unit or a digital unit connected to different user equipments (UEs) (a UE is any device capable of communication with an access node of the access layer). When a UE wants to access a RAN service, it will connect to an access node and the access node will then request some service provided by the cloud system 100 (e.g., a service provided by an entity in the 1st layer 106.

FIG. 1 also shows three layers—a first layer 106, a second layer 108, and a third layer 109. Each layer includes a plurality of entities that can provide the same service (hence each layer can be considered a cluster or a set of clusters). Each entity may be a computer, a virtual machine, a container, or other component which implements a particular function and provides a particular service. Entities that implement and are capable of executing the same function may be grouped together and form a cluster. Entities in the same cluster may share load and provide fault tolerance. All entities in the same cluster do not have to be in the same physical host.

The system 100 shown in FIG. 1 is multi-layered. An entity in the first layer 106 may provide some service to an access node in the access layer 104 and may also require a service provided by an entity in the second layer 108. The connections between different entities in different layers may exist for a long time and be reused for many different sessions.

Figure 2:
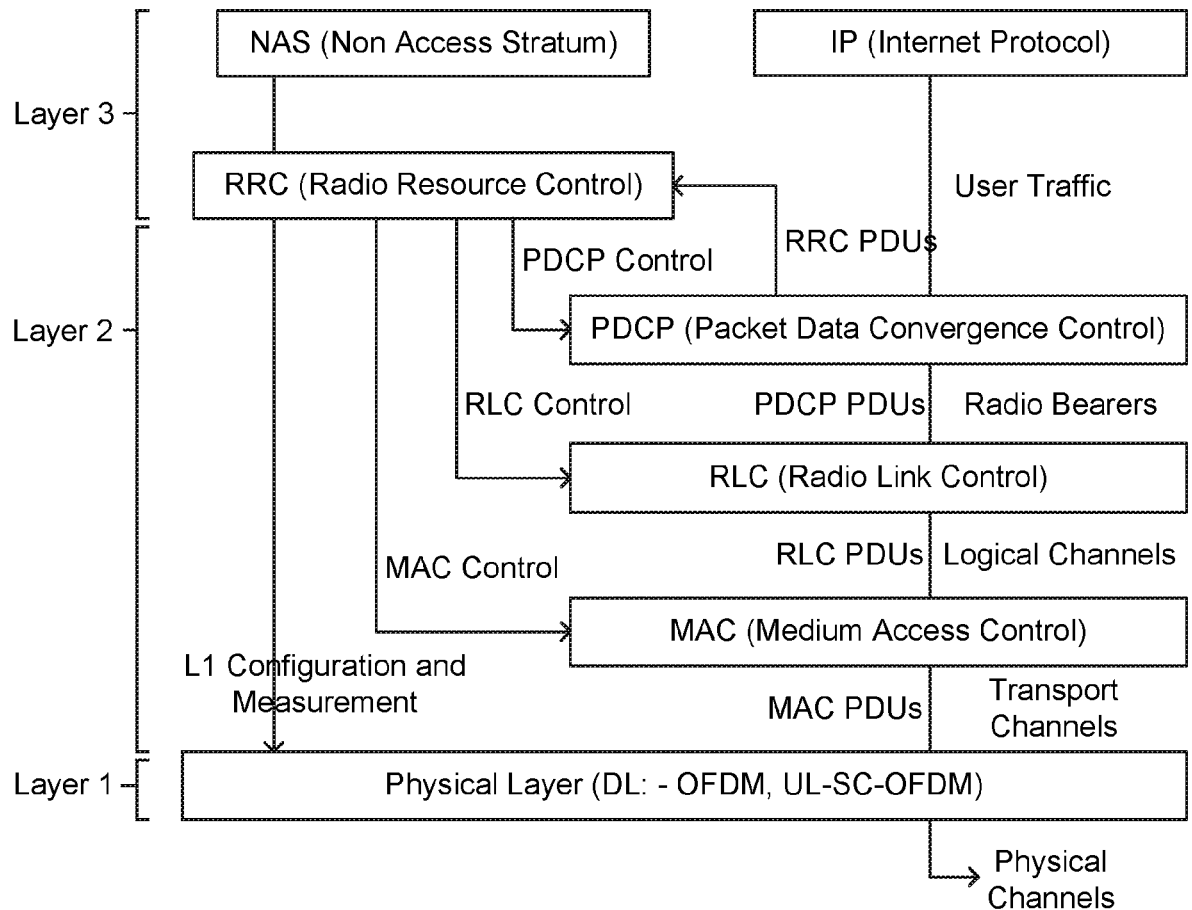
FIG. 2 shows an example of a multi-layer application.

FIG. 2 illustrates an example of the multi-layer system 100. FIG. 2 is an exemplary diagram of an Evolved Universal Terrestrial Radio Access Network (E-UTRAN) Protocol Stack having multiple layers. As shown in the figure, each layer of the multi-layer system is configured to provide a service to a lower layer (if there is any) and is configured to obtain a service from an upper layer (if there is any).

Referring back to FIG. 1, when the access layer 104 needs a service from the third layer 109, the access layer 104 may send a request to the first layer 106. In response to the request sent by the access layer 104, the first layer 106 performs a process and sends a request to the second layer 108 according to an existing context route. After receiving the request, the second layer 108 continues the process and sends a request to the third layer 109. According to the embodiments shown in FIG. 1, information about main and backup entities in different layers is also exchanged between the different layers such that an entity in a layer knows the main and backup entities in the higher layer and the lower layer. Thus, in a fault situation (e.g., when one entity in a layer crashes), the corresponding entities in the lower layer and the higher layer know which backup entity can be used instead of the crashed entity.

A load balancer 102 may be used to decide which entity in a cluster is to provide the service to a specific UE when a session is established for the first time. When the session is established, further information flow on the session may be sent directly to a serving entity. This will improve performance compared to the normal solution of always sending a request to the load balancer or an agent and of the load balancer or the agent rerouting the request to a serving entity. The session in different layers may be different because different information may be used.

In the embodiments shown in FIG. 1, the load balancer is centralized. But the load balancer may also be distributed. Specifically, in some embodiments, multiple load balancers may be used in the system. For example, one load balancer may be provided for each layer such that there is one load balancer dedicated for load balancing for each layer.

Figure 3:
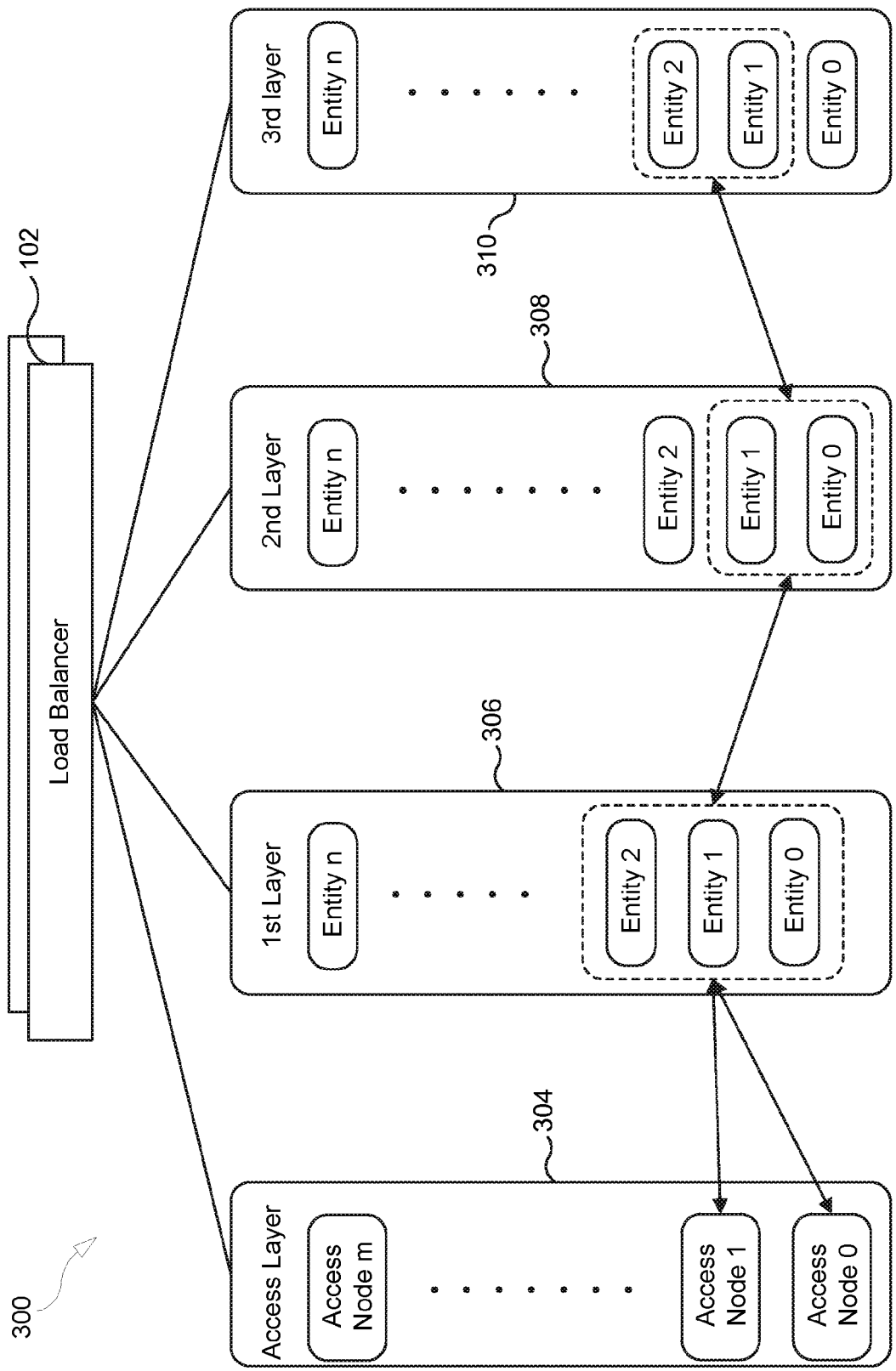
FIG. 3 illustrates a system according to some embodiments.

FIG. 3 shows a system 300 according to some embodiments. As compared to the system 100 shown in FIG. 1, in the system 300, each layer may be divided into multiple clusters, and main and backup serving entities for a session may be selected only from the same cluster. This limit in the selection may simplify data replication or event broadcast operation. For example, when entity 1 in a first layer 306 is marked as unavailable, the message indicating the unavailability of the entity 1 in the first layer 306 may only need to be broadcasted to the entities in the same cluster (e.g., entities 0 and 2 in the first layer 306) and some cluster in the neighboring layers (e.g., entities 0 and 1 in a second layer 308 and access nodes 0 and 1 in an access layer 304).

Figure 4:
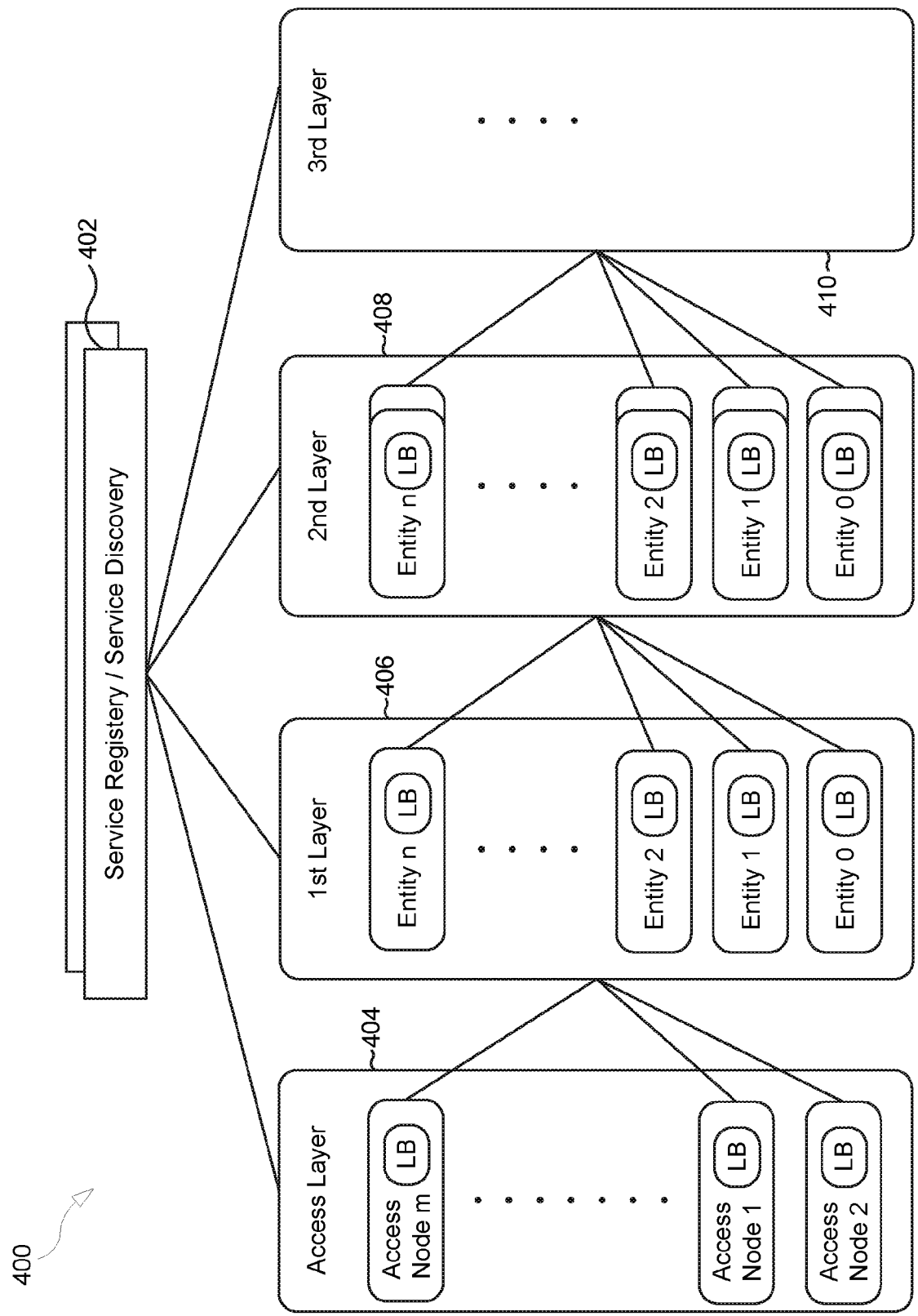
FIG. 4 illustrates a system according to some embodiments.

FIG. 4 shows a system 400 having a distributed system structure according to some embodiments. In the system 400, a load balancer is integrated within each access node in an access layer 404 and each entity in a first layer 406, a second layer 408, and a third layer 410. Each load balancer may obtain information regarding entities in another layer from a service registry 402. For example, a load balancer integrated within entity 1 in the first layer 406 may get from the service registry 402 information that there are m entities in the second layer 308 and how to connect to them (e.g., IP addresses, ports, etc.). The load balancer may also collect load information for entities.

When the entity 1 in the first layer 406 wants a service from the second layer 408, the load balancer integrated with the entity 1 of the first layer 406 may directly help to choose serving entities in the second layer 408. For example, the load balancer integrated with the entity 1 of the first layer 406 may choose a main serving entity and a backup serving entity in the second layer 408.

Even though, in the embodiments shown in FIG. 4, a load balancer is provided for each access node or each entity in a layer, in other embodiments, a load balancer may be provided for several entities located in the same host.

A load balancer may be a logical function module which may be centralized or distributed. The load balancer's core function is to choose entities as service providers. According to some embodiments of this disclosure, the load balancer is configured to choose main serving entities and backup serving entities for stateful service.

Figure 5:
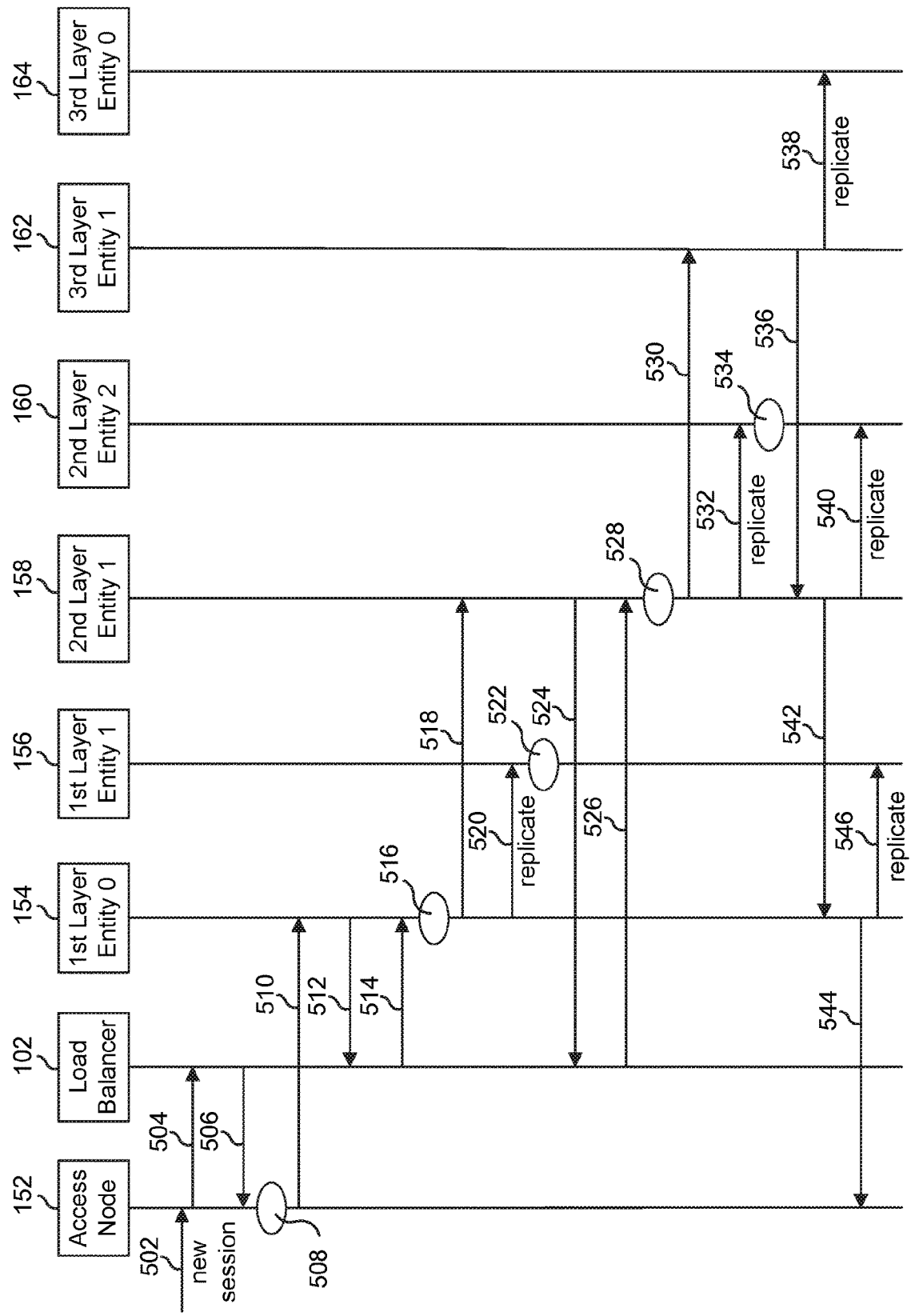
FIG. 5 shows a message flow diagram according to some embodiments.

FIG. 5 is a message flow diagram according to some embodiments. The message flow diagram illustrates a process for setting up session data in each layer of a multi-layer system when, for example, a UE wants a service provided by a cloud environment from the multi-layer system.

In the embodiments shown in FIG. 5, when a UE (not shown in the figure) wants the service provided by the cloud environment, it sends to an access node 152 a new session request 502. As a result of receiving the request 502, the access node 152 sends to the load balancer 102 a request 504 for information regarding serving entities in the first layer 106.

As a result of receiving the request 504, the load balancer 102 may obtain from a service registry and discovery system (not shown in FIG. 5) information as to which cluster is capable of providing a particular service and information (e.g., identifiers of entities) regarding all entities included in the cluster capable providing the particular service. The service registry and discovery system has the information about entities because when an entity starts up or shuts down, updated information corresponding to the changed status of the entity is stored or registered in the system. The service registry and discovery system may be located within a load balancing system (e.g., the load balancer 102 shown in FIG. 5) or may be provided as an individual module.

Based on the information obtained from the service registry and discovery system, the load balancer 102 may select a first layer entity 154 as a main serving entity (i.e., entity 0 of the 1st layer) and a first layer entity 156 as a backup serving entity (i.e., entity 1 of the 1st layer). After selecting the main serving entity 154 and the backup serving entity 156, the load balancer 102 may send to the access node 152 a message 506 including information indicating that the entity 154 is the main serving entity and entity 156 is the backup serving entity.

As a result of receiving the message 506, the access node 152 may perform a process 508. In the process 508, if message transferring is based on a protocol which requires a connection (for example, transmission control protocol (TCP)), the access node 152 checks if a connection to the first layer entity 154 and/or a connection to the first layer entity 156 exists or not. If any of the connections does not exist, the access node 152 may set up the connection to the first layer entity 154 and/or the connection to the first layer entity 156. After the connections are setup, the connections may be reused for many sessions.

After performing the process 508, the access node 152 may send to the first layer entity 154 a message 510. The message 510 may include a session request and information indicating that for this session, the first layer entity 154 is the main serving entity and the first layer entity 156 is the backup serving entity. By receiving the message 510, the first layer entity 154 may know that first layer session data for the UE needs to be replicated to the first layer entity 156.

After receiving the message 510, the first layer entity 154 may execute a function and send to the load balancer 102 a request 512 for information regarding serving entities in the second layer 108.

As a result of receiving the request 512, the load balancer 102 may obtain from the service registry and discovery system information as to which cluster is capable of providing a particular service and information (e.g., identifiers of entities) regarding all entities included in the cluster capable providing the particular service.

Based on the information obtained from the service registry and discovery system, the load balancer 102 may select a second layer entity 158 as a main serving entity (in the example shown the main serving entity 158 is entity 1 of the 2nd layer) and a second layer entity 160 as a backup serving entity (in the example shown the backup serving entity 160 is entity 2 of the 2nd layer). After selecting the second layer entity 158 and the second layer entity 160, the load balancer 102 may send to the first layer entity 154 a message 514 including information indicating that entity 158 is the main serving entity for the 2nd layer 108 and entity 160 is the backup serving entity for the 2nd layer 108.

After receiving the message 514, the first layer entity 154 may perform a process 516 for connection set up. The process 516 is similar to the process 508 performed by the access node 152. Specifically, the first layer entity 154 may check if a connection to the second layer entity 158 and/or a connection to the second layer entity 160 exists or not. If any of the connections does not exist, the first layer entity 154 may set up the connection to the second layer entity 158 and/or the connection to the second layer entity 160. After the connections are setup, the connections may be reused for many sessions.

After performing the process 516, the first layer entity 154 may send to the second layer entity 158 a message 518. The message 518 may include a session request and information identifying the first layer entity 154 as the main client entity in the first layer, the first layer entity 156 as a backup client entity in the first layer, the second layer entity 158 as the main serving entity in the second layer, and the second layer entity 160 as a backup serving entity in the second layer.

The first layer entity 154 may also send a replication message 520 to the first layer entity 156. The replication message 520 may include the first layer session data and information identifying the first layer entity 154 as a main client entity in the first layer, the first layer entity 156 as a backup client entity in the first layer, the second layer entity 158 as a main serving entity in the second layer, and the second layer entity 160 as a backup serving entity in the second layer.

In some embodiments, after the first layer entity 156 receives the replication message 520, the first layer entity 156 may perform a process 522. The process 522 is similar to the process 516 performed by the first layer entity 154. Specifically, the first layer entity 156 may check if a connection to the second layer entity 158 and/or a connection to the second layer entity 160 exists or not. If any of the connections does not exist, the first layer entity 156 may set up the connection to the second layer entity 158 and the connection to the second layer entity 160.

After receiving the message 518, the second layer entity 158 may send to the load balancer 102 a request 524 for serving entities in the third layer 109.

As a result of receiving the request 524, the load balancer 102 may obtain from the service registry and discovery system (not shown in FIG. 5) information as to which cluster of the 3rd layer 109 is capable of providing a particular service and information (e.g., identifiers of entities) regarding all entities included in the cluster capable providing the particular service.

Based on the information obtained from the service registry and discovery system, the load balancer 102 may select a third layer entity 162 as a main serving entity and a third layer entity 164 as a backup serving entity from the third layer. After selecting the third layer entity 162 and the third layer entity 164, the load balancer 102 may send to the second layer entity 158 a message 526 including information indicating that the third layer entity 162 is the main serving entity and the third layer entity 164 is the backup serving entity.

After receiving the message 526, the second layer entity 158 may perform a process 528 for connection set up. The process 528 is similar to the process 516 performed by the first access node 154. Specifically, the second layer entity 158 may check if a connection to the third layer entity 162 and/or a connection to the third layer entity 164 exists or not. If any of the connections does not exist, the second layer entity 158 may set up the connection to the third layer entity 162 and/or the connection to the third layer entity 164. After the connections are setup, the connections may be reused for many sessions.

After performing the process 528, the second layer entity 158 may send to the third layer entity 162 a message 530. The message 530 may include a session request and information identifying the second layer entity 158 as a main client entity in the second layer, the second layer entity 160 as a backup client entity in the second layer, the third layer entity 162 as a main serving entity in the third layer, and the third layer entity 164 as a backup serving entity in the third layer.

The second layer entity 158 may also send a replication message 532 to the second layer entity 160. The replication message 532 may include the second layer session data and information identifying the second layer entity 158 as a main client entity in the second layer, the second layer entity 160 as a backup client entity in the second layer, the third layer entity 162 as a main serving entity in the third layer, and the third layer entity 164 as a backup serving entity in the third layer.

In some embodiments, after the second layer entity 160 receives the replication message 532, the second layer entity 160 may perform a process 534. The process 534 is similar to the process 528 performed by the second layer entity 158. Specifically, the second layer entity 160 may check if a connection to the third layer entity 162 and/or a connection to the third layer entity 164 exists or not. If any of the connections does not exist, the second layer entity 160 may set up the connection to the third layer entity 162 and the connection to the third layer entity 164.

After receiving the message 530, the third layer entity 162 may execute a function and may setup full third layer session data. After setting up the third layer session data, the third layer entity 162 sends a reply message 536 to the second layer entity 158.

The third layer entity 162 may also send a replication message 538 to the third layer entity 164. The replication message 538 may include the third layer session data and information identifying the second layer entity 158 as a main client entity in the second layer and the second layer entity 160 as a backup client entity in the second layer.

After receiving the reply message 536, the second layer entity 158 sends a reply message 542 to the first layer entity 154.

If the second layer session data has been changed, the second layer entity 158 may also send to the second layer entity 160 a replication message 540 including information about the changed second layer session data.

After receiving the reply message 542, the first layer entity 154 sends a reply message 544 to the access node 152.

If the first layer session data has been changed, the first layer entity 154 may also send to the first layer entity 156 a replication message 546 including information about the changed first layer session data.

The process illustrated in FIG. 5 results in that each entity has a backward and a forward link to main and backup entities in the lower and higher layers, where the main entities and the backup entities are synchronized with respect to session data.

The process shown in FIG. 5 is applicable to a stateful service that involves a sequence of interactions. In stateful services, after a session is setup, session data is created and following interactions in services require the session data. By applying the process shown in FIG. 5, a stateful service may be provided with a fault tolerance function.

Figure 6:
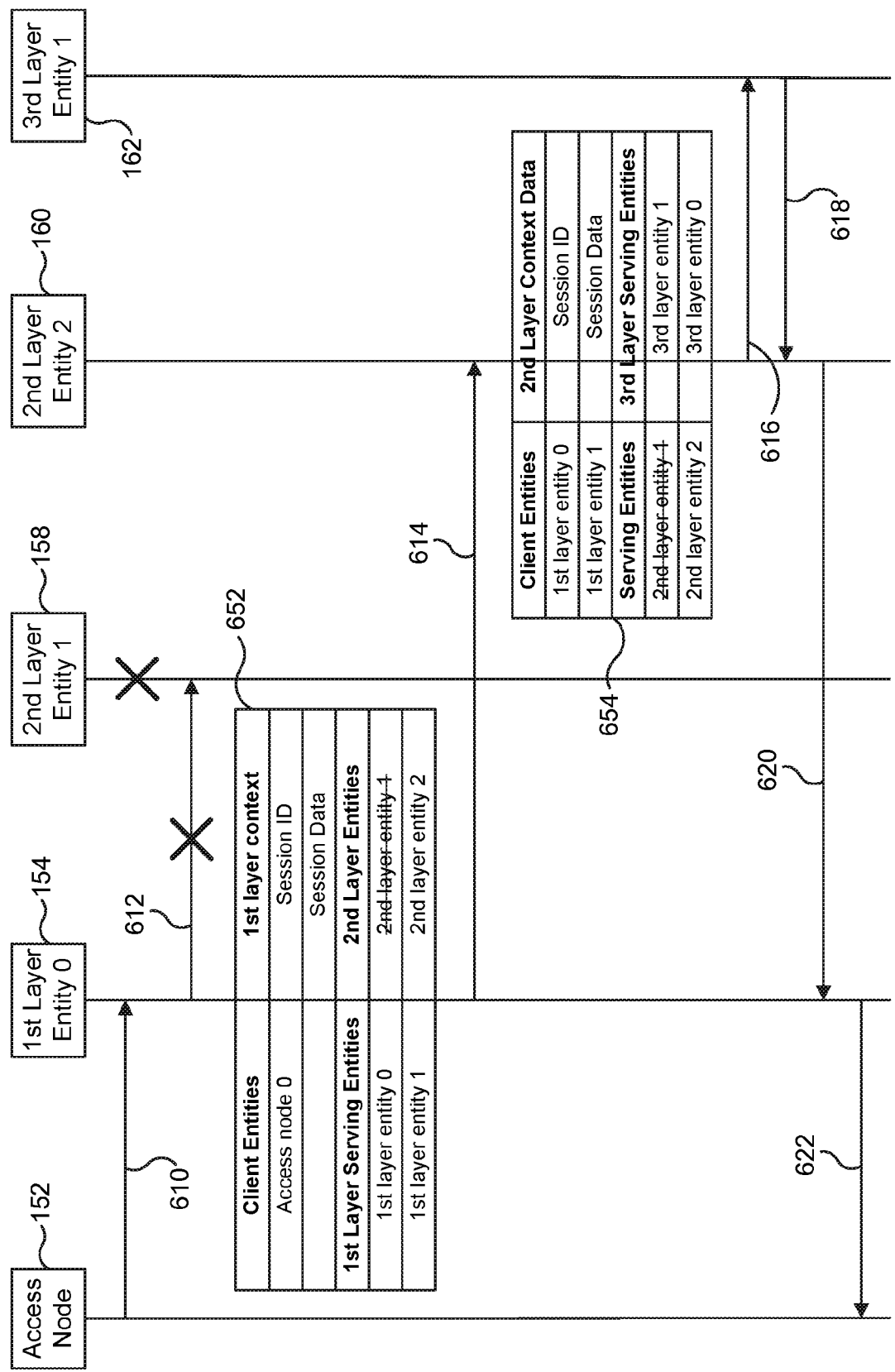
FIG. 6 shows a message flow diagram for fault tolerance solution according to some embodiments.

FIG. 6 is a message flow diagram illustrating a message flow according to some embodiments. The message flow allows continuing a service even when an entity in a middle layer fails on the forward path after an initial session for a specific UE has been set up.

After the initial session has been set up, the access node 152 may send to the first layer entity 154 a session request 610. Here, the access node 152 sends the request 610 to the first layer entity 154 because previous session information indicates that the first layer entity 154 is the main serving entity for this session in the first layer.

After receiving the session request 610, if the second layer entity 158 was available, the first layer entity 154 would have sent a session request 612 to the second layer entity 158 because previous session information indicates that the second layer entity 158 is the main serving entity for this session in the second layer. But here the second layer entity 158 became unavailable after the initial session has been set up.

Information indicating the unavailability of the second layer entity 158 may be provided to the first layer entity 154 and to the third layer entity 162. Specifically, in some embodiments, the load balancer may broadcast, multi-cast, or unicast the information indicating the unavailability of the second layer entity 158.

The load balancer may obtain the availability information by detecting the unavailability of the second layer entity 158 by itself or by receiving a message containing the unavailability information from a separate entity monitor which is capable of detecting the unavailability of the second layer entity 158.

Once the first layer entity 154 receives the information indicating the unavailability of the second layer entity 158, the first layer entity 154 may update session information stored in the first layer entity 154. The table 652 illustrates exemplary session information stored in the first layer entity 154. As shown in the table, after the first layer entity 154 receives the information regarding the unavailability of the second layer entity 158, the first layer entity 154 may assign the second layer entity 160 as a main entity for this session in the second layer.

After assigning the second layer entity 160 as the main entity in the second layer for this session, the first layer entity 154 may send a session request 614 to the second layer entity 160 instead of sending the session request 612 to the second layer entity 158.

As described with respect to the message 532 shown in FIG. 5, information regarding the current session was previously replicated from the second layer entity 158 to the second layer entity 160. Thus, the second layer entity 160 has all the session information the second layer entity 158 had. The table 654 illustrates exemplary session information stored in the second layer entity 160. As shown in the table, the second layer entity 160 has the current session ID and data, the main and backup entities of the first layer and the main band backup entities of the third layer for the session.

Thus, after receiving the session request 614, the second layer entity 160 may send a session request to the third layer entity 162. Because the third layer entity 162 also knows that the second layer entity 158 is the main entity for this specific UE session, the third layer entity 162 knows that the message 614 is for this specific UE session.

As a result of receiving the message 616, the third layer entity 162 may send a reply message 618 to the second layer entity 160.

After receiving the reply message 618, the second layer entity 160 may send a reply message 620 to the first layer entity 154 and as a result of receiving the message 620, the first layer entity 154 may send a reply message 622 to the access node 154.

In the embodiments of this disclosure, when session data for a layer changes, replication of corresponding session data to a backup serving entity needs to be done. But this is not shown in the message flow diagram for brevity.

Figure 7:
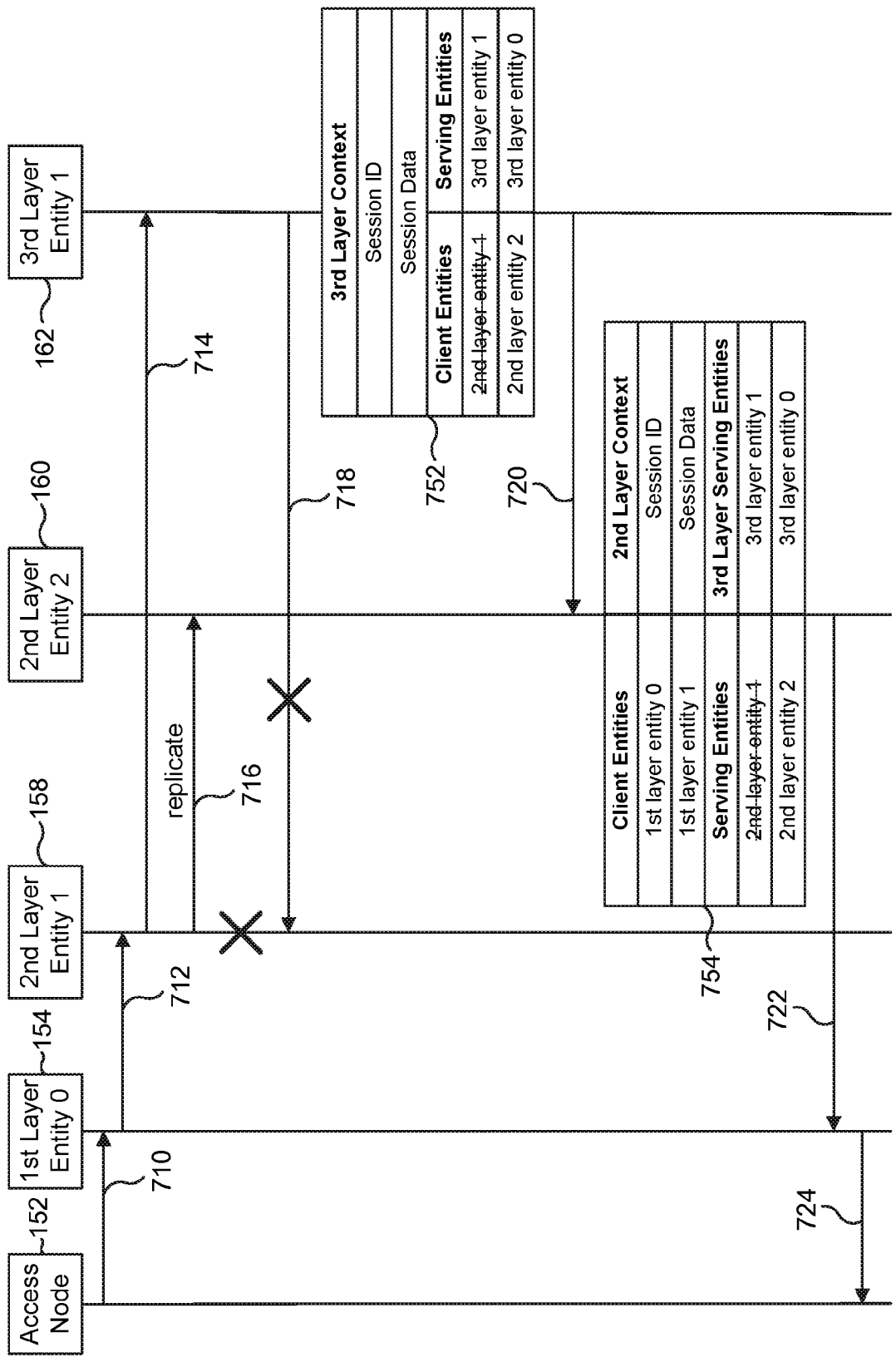
FIG. 7 shows a message flow diagram for fault tolerance solution according to some embodiments.

FIG. 7 is a message flow diagram according to some embodiments. The message flow diagram illustrates a process for continuing a service when an entity in a middle layer fails on the backward path after an initial session for a specific UE has been set up.

After the initial session has been set up, the access node 152 may send to the first layer entity 154 a session request 710. Here, the access node 152 sends the session request 710 to the first layer entity 154 because previous session information indicates that the first layer entity 154 is the main serving entity for this session in the first layer.

As a result of receiving the session request 710, the first layer entity 154 may send to the second layer entity 158 a session request 712. Here, the first layer entity 154 sends the session request 712 to the second layer entity 158 because previous session information indicates that the second layer entity 158 is the main serving entity for this session in the second layer.

After receiving the session request 712, the second layer entity 158 may send to the third layer entity 162 a session request 714. Here, the second layer entity 158 sends the session request 714 to the third layer entity 162 because previous session information indicates that the third layer entity 162 is the main serving entity for this session in the third layer.

The second layer entity 158 may also send a replication message 716 to the second layer entity 160. The replication message 716 is similar to the replication message 532 shown in FIG. 5.

After receiving the session request 714, if the second layer entity 158 was available, the third layer entity 162 would have sent a reply message 718 to the second layer entity 158 because previous session information indicates that the second layer entity 158 is the main serving entity for this session in the second layer. But here the second layer entity 158 became unavailable after the third layer entity 162 received the session request 714.

As explained above, information declaring the unavailability of the second layer entity 158 may be provided to the first layer entity 154 and to the third layer entity 162. Specifically, in some embodiments, the load balancer may broadcast the information or unicast to the first layer entity 154 and the third layer entity 162 the information indicating the unavailability of the second layer entity 158.

Once the third layer entity 162 receives the information declaring the unavailability of the second layer entity 158, the third layer entity 162 may update session information stored in the third layer entity 162. The table 752 illustrates exemplary session information stored in the third layer entity 162. As shown in the table, after the third layer entity 162 receives the information declaring the unavailability of the second layer entity 158, the third layer entity 162 may assign the second layer entity 160 as a main entity for this session in the second layer.

After assigning the second layer entity 160 as the main entity in the second layer for this session, the third layer entity 162 may send a reply message 720 to the second layer entity 160 instead of sending the reply message 718 to the second layer entity 158.

As mentioned with respect to the message 716, information regarding the current session was previously replicated from the second layer entity 158 to the second layer entity 160. Thus, the second layer entity 160 has all the session information the second layer entity 158 had. The table 754 illustrates exemplary session information stored in the second layer entity 160. As shown in the table, the second layer entity 160 has the current session ID and data, the main and backup entities of the first layer and the main band backup entities of the third layer for the session.

Thus, after receiving the reply message 720, the second layer entity 160 may send a reply message 722 to the first layer entity 154. The reply message 722 corresponds to the session request 712 because the second layer session data is stored in the second layer entity 160. In response to receiving the reply message 722, the first layer entity 154 may send a reply message 724 to the access node 152.

Figure 8:
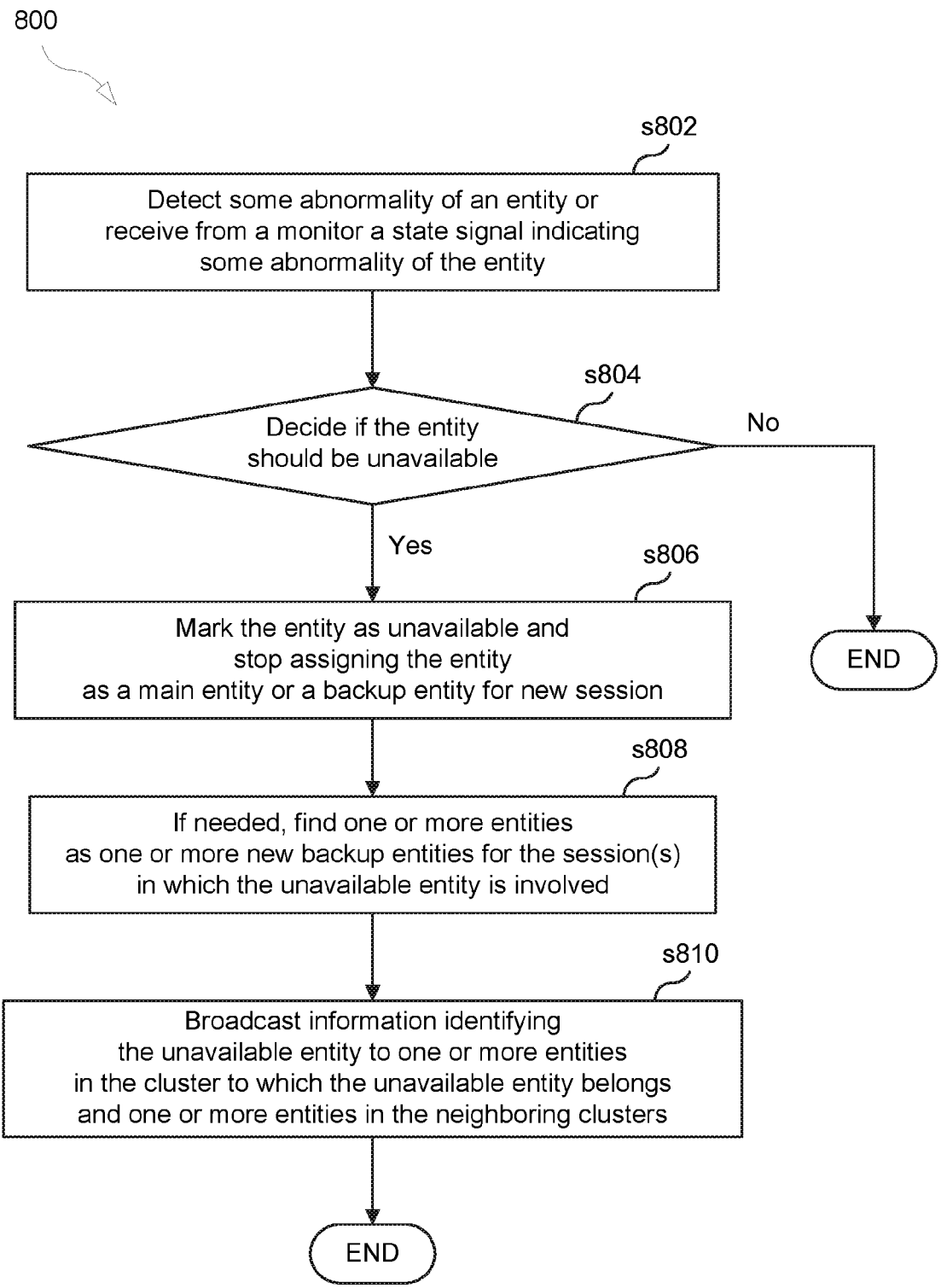
FIG. 8 shows a flow chart illustrating a process performed by a load balancer according to some embodiments.

FIG. 8 is a flow chart illustrating a process 800 according to some embodiments. The process 800 may be performed by a load balancer or an agent after an entity in a layer malfunctions.

In step s802, the load balancer or the agent may detect the malfunction of the entity. In some embodiments, instead of directly detecting the malfunction of the entity, the load balancer or the agent may detect the malfunction by receiving from an entity monitor a message declaring the malfunction of the entity.

The load balancer or a separate entity monitor may detect the malfunction of the entity by collecting running information such as heart beaten, CPU load, memory usage, or application level measurements, etc. and by judging the current state of the entity according to one or more criteria.

In step s804, after obtaining information indicating the malfunction of the entity, the load balancer or the agent may decide whether the entity should be treated as unavailable or not. If the load balancer or the agent decides that the entity should not be treated as unavailable, the process ends. On the other hand, if the load balancer or the agent decides that the entity should be treated as unavailable, the process proceeds to step s806.

In step s806, the load balancer or the agent may mark the entity as unavailable and may stop assigning the unavailable entity as a main entity or a backup entity for any new session.

In step s808, if needed, the load balancer or the agent may find one or more entities as one or more new backup entities for the sessions in which the unavailable entity is involved.

In steps s810, the load balancer or the agent may broadcast information identifying the unavailable entity to one or more entities in the cluster to which the unavailable entity belongs and one or more entities in the neighboring clusters.

Even though the unavailable entity may not be operative for providing a service, it may still be able to receive the broadcasted information. In such case, if the unavailable entity is a main entity for a session, after receiving the broadcasted information, the unavailable entity may replicate session data to other backup entities.

Figure 9:
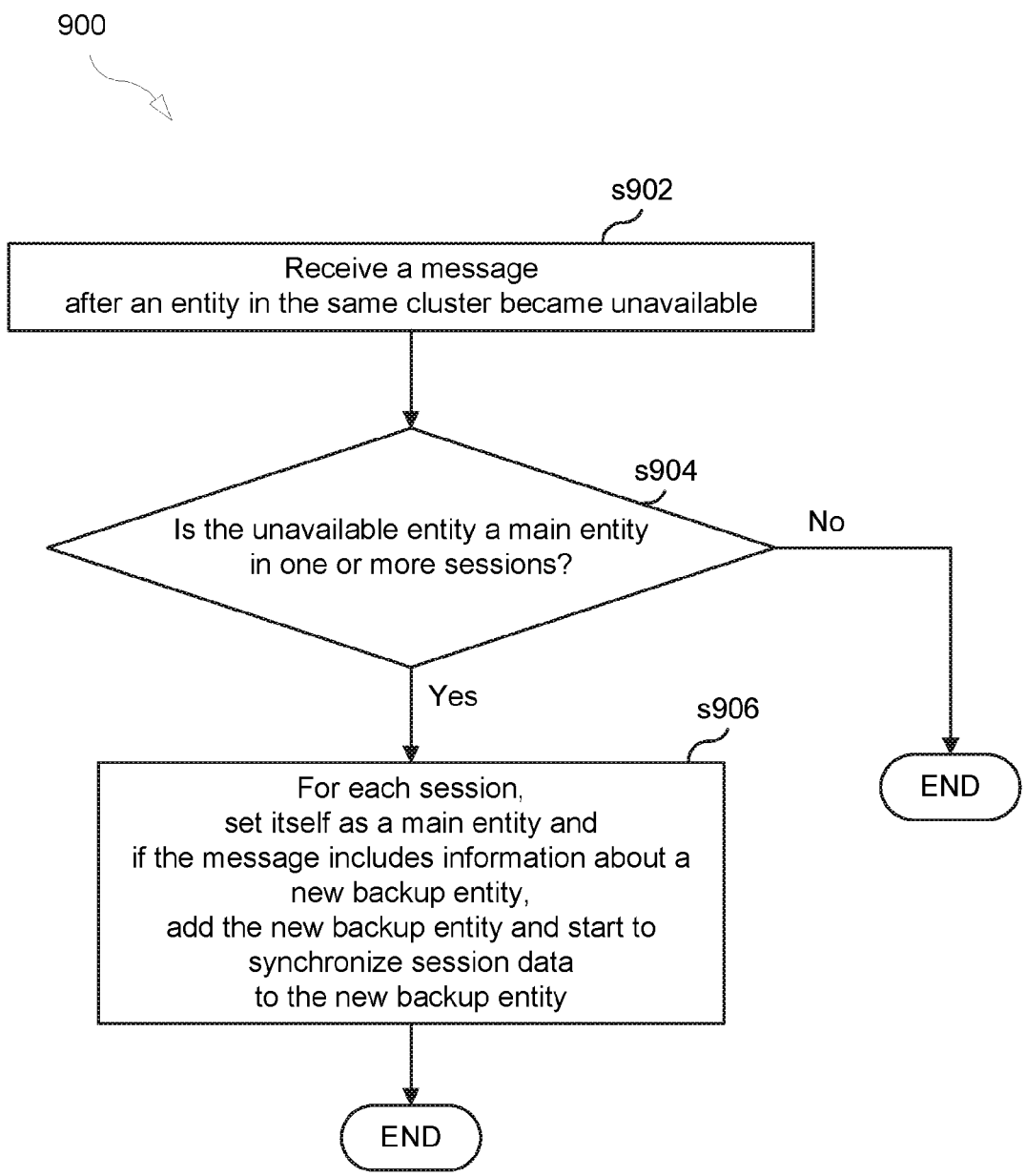
FIG. 9 shows a flow chart illustrating a process performed by an entity according to some embodiments.

FIG. 9 is a flow chart illustrating a process 900 according to some embodiments. The process 900 may be performed by a backup entity in a cluster when another entity in the same cluster becomes unavailable. For example, in the embodiments shown in FIGS. 6 and 7, the process 900 may be performed by the second layer entity 160.

In step s902, the backup entity in the cluster may receive a message after another entity in the same cluster became unavailable. The message may be broadcasted by a load balancer. The broadcasted message may include information identifying the unavailable entity.

In step s904, after receiving the message, the backup entity may determine if the unavailable entity identified in the message is a main entity in one or more sessions. If the identified unavailable entity is not a main entity in one or more sessions, the process ends. On the other hand, if the identified unavailable entity is a main entity in one or more sessions, the process proceeds to step s906.

In step s906, as a result of determining that the identified unavailable entity is a main entity in one or more sessions, the backup entity may set itself as a new main entity for said one or more sessions. Also, if the message includes information about a new backup entity, the new main entity (i.e., the old backup entity) may add the new backup entity as a backup entity and start to synchronize session data to the new backup entity.

Figure 10:
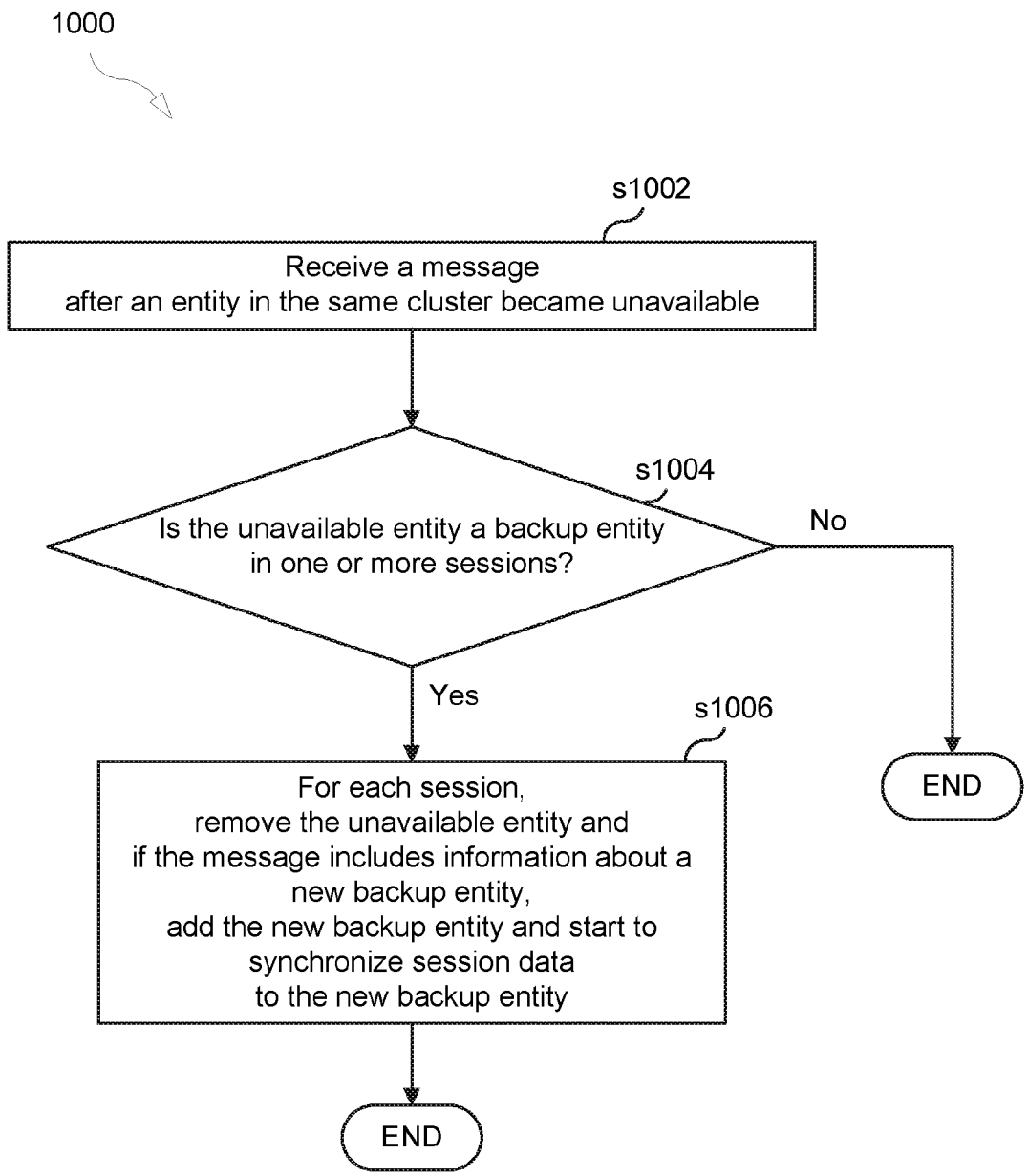
FIG. 10 shows a flow chart illustrating a process performed by an entity according to some embodiments.

FIG. 10 is a flow chart illustrating a process 1000 according to some embodiments. The process 1000 may be performed by a main entity in the cluster when another entity in the same cluster became unavailable.

In step s1002, the main entity in the cluster may receive a message after another entity in the same cluster became unavailable. The message may be broadcast, multi-cast, or unicast by the load balancer. The message may include information identifying the unavailable entity.

In step s1004, after receiving the message, the main entity may determine if the unavailable entity identified in the message is a backup entity in one or more sessions. If the identified unavailable entity is not a backup entity in one or more sessions, the process ends. On the other hand, if the identified unavailable entity is a backup entity in one or more sessions, the process proceeds to step s1006.

In step s1006, as a result of determining that the identified unavailable entity is a backup entity in one or more sessions, the main entity may remove the unavailable entity from said one or more sessions. Also, if the message includes information about a new backup entity, the main entity may add the new backup entity as a backup entity and start to synchronize session data to the new backup entity.

Figure 11:
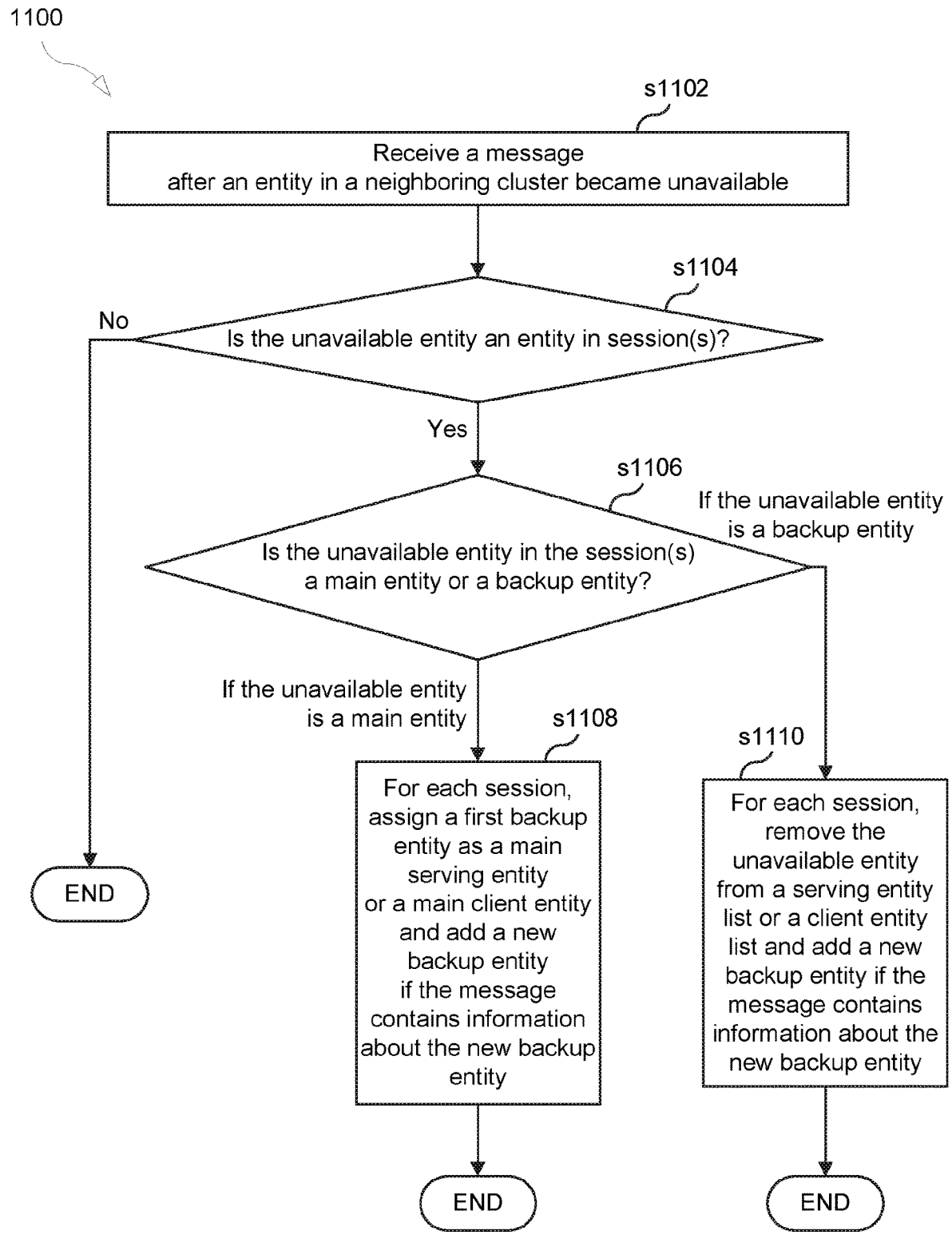
FIG. 11 shows a flow chart illustrating a process performed by an entity according to some embodiments.

FIG. 11 is a flow chart illustrating a process 1100 according to some embodiments. The process 1100 may be performed by an entity in a cluster after the entity receives a message indicating that another entity in a neighboring cluster has become unavailable. For example, in the embodiments shown in FIG. 6, the first layer entity 154 may perform the process 1100. Similarly, in the embodiments shown in FIG. 7, the third layer entity 162 may perform the process 1100.

In step s1102, the entity in the cluster may receive a message transmitted by a load balancer (e.g., the message may be broadcast, multi-cast, or unicast). The message may indicate that another entity in the neighboring cluster has become unavailable. After receiving the message, in step s1104, the entity may determine whether the indicated unavailable entity in the neighboring cluster is an entity handling one or more sessions. If the indicated unavailable entity is not handling any session, the process ends. On the other hand, if the indicated unavailable entity is handling at least one session, the process proceeds to step s1106.

In step s1106, the entity may check whether the unavailable entity is a main entity or a backup entity in the neighboring cluster.

If the unavailable entity is a main entity in the neighboring cluster, the process proceeds to step s1108.

In step s1108, the entity may assign a known backup entity as a main entity. The information about the known backup entity may be obtained from previous session information. For example, in the embodiment shown in FIG. 6, based on previous session information, the first layer entity 154 knows that the second layer entity 160 is a backup entity in the second layer.

In step s1108, the entity may also add a new backup entity if the broadcasted message contains information about the new backup entity.

On the other hand, if the unavailable entity is a backup entity in the neighboring cluster, the process proceeds to step s1110.

In step s1110, the entity removes the unavailable entity from an (either serving or client) entity list. The entity may also add a new backup entity if the broadcasted message contains information about the new backup entity.

Figure 12:
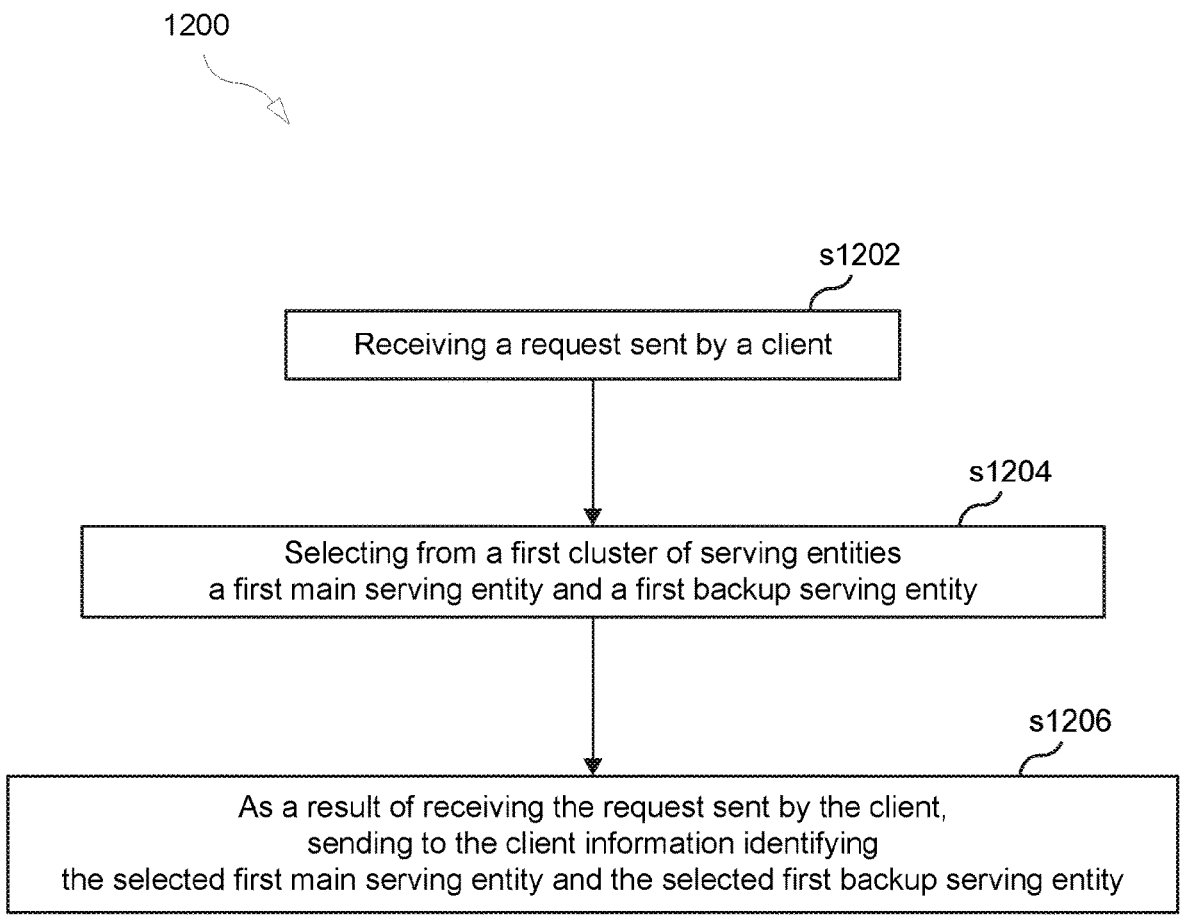
FIG. 12 is a flow chart illustrating a process according to some embodiments.

FIG. 12 is a flow chart illustrating a process 1200 according to an embodiment. Process 1200 may be performed by a load balancing system. Process 1200 may begin in step s1202.

Step s1202 comprises receiving a request sent by a client.

Step s1204 comprises selecting from a first cluster of serving entities a first main serving entity and a first backup serving entity.

Step s1206 comprises as a result of receiving the request sent by the client, sending to the client information identifying the selected first main serving entity and the selected first backup serving entity.

In some embodiments, process 1200 further includes (a) after sending to the client the information identifying the selected first main serving entity and the selected first backup serving entity, receiving a request sent by the first main serving entity, (b) selecting from a second cluster of serving entities a second main serving entity and a second backup serving entity, and (c) as a result of receiving the request sent by the first main serving entity, sending to the first main serving entity information identifying the selected second main serving entity and the selected second backup serving entity.

In some embodiments, process 1200 further includes obtaining unavailability information indicating that the first main serving entity or the first backup serving entity is unavailable and as a result of obtaining the unavailability information, sending to one or more entities information indicating that the first main serving entity or the first backup serving entity is unavailable.

In some embodiments, process 1200 further includes as a result of obtaining the unavailability information, selecting an additional backup serving entity from the first cluster of serving entities and sending to said one or more entities information identifying the selected additional backup serving entity.

In some embodiments, the load balancing system may be either centralized or distributed.

In some embodiments, process 1200 further includes obtaining from a service registry information regarding all entities in the first cluster of serving entities. The first cluster of serving entities may be associated with one or more particular types of service.

Figure 13:
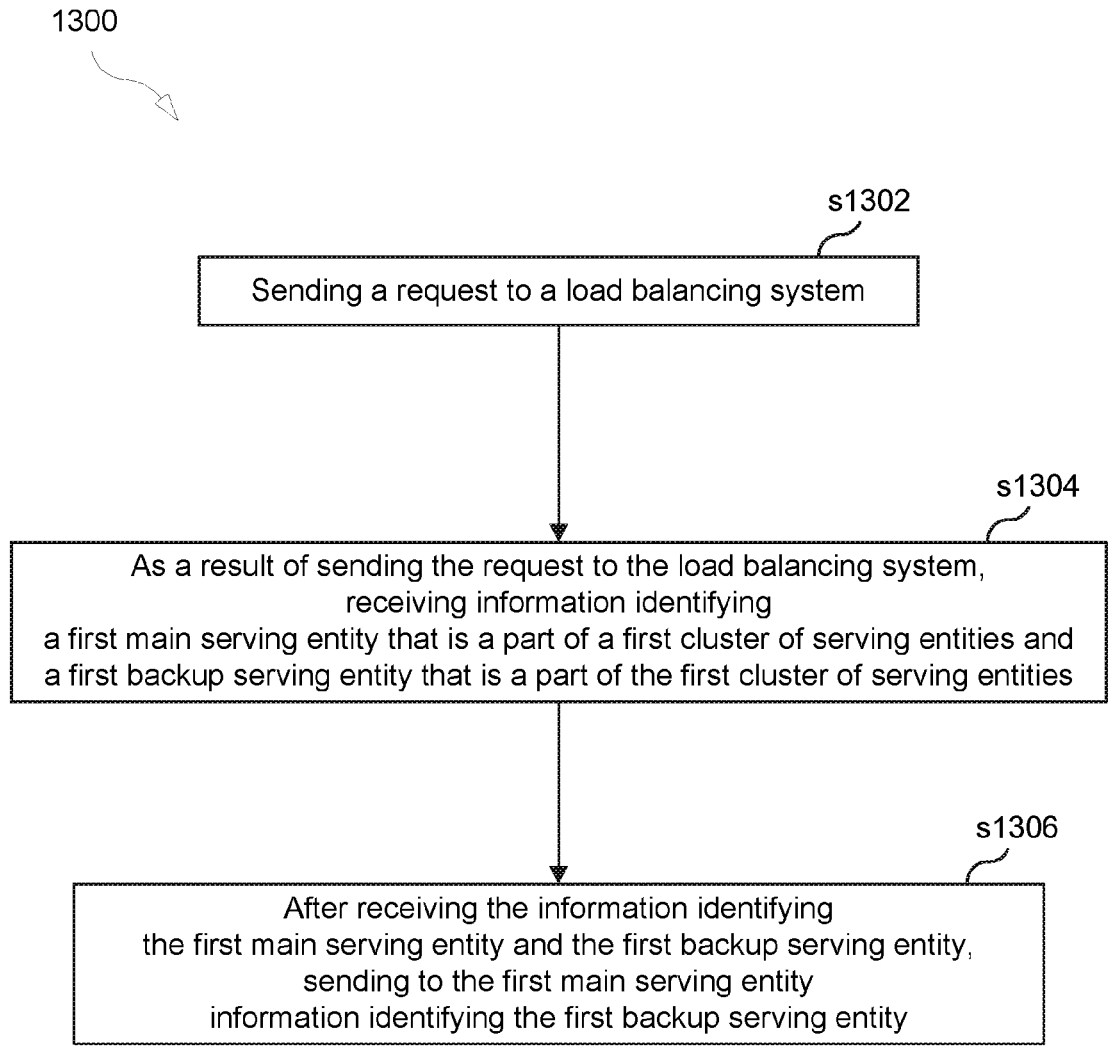
FIG. 13 is a flow chart illustrating a process according to some embodiments.

FIG. 13 is a flow chart illustrating a process 1300 according to an embodiment. Process 1300 may be performed by a client. Process 1300 may begin in step s1302.

Step s1302 comprises sending a request to a load balancing system.

Step s1304 comprises as a result of sending the request to the load balancing system, receiving information identifying a first main serving entity that is a part of a first cluster of serving entities and a first backup serving entity that is a part of the first cluster of serving entities. In some embodiments, the information may be sent by the load balancing system.

Step s1306 comprises after receiving the information identifying the first main serving entity and the first backup serving entity, sending to the first main serving entity information identifying the first backup serving entity.

In some embodiments, process 1300 further includes determining whether a connection to the first main serving entity and/or a connection to the first backup serving entity exists. Process 1300 may further includes as a result of determining that the connection to the first main serving entity does not exist, setting up the connection to the first main serving entity and as a result of determining that the connection to the first backup serving entity does not exist, setting up the connection to the first backup serving entity.

Figure 14:
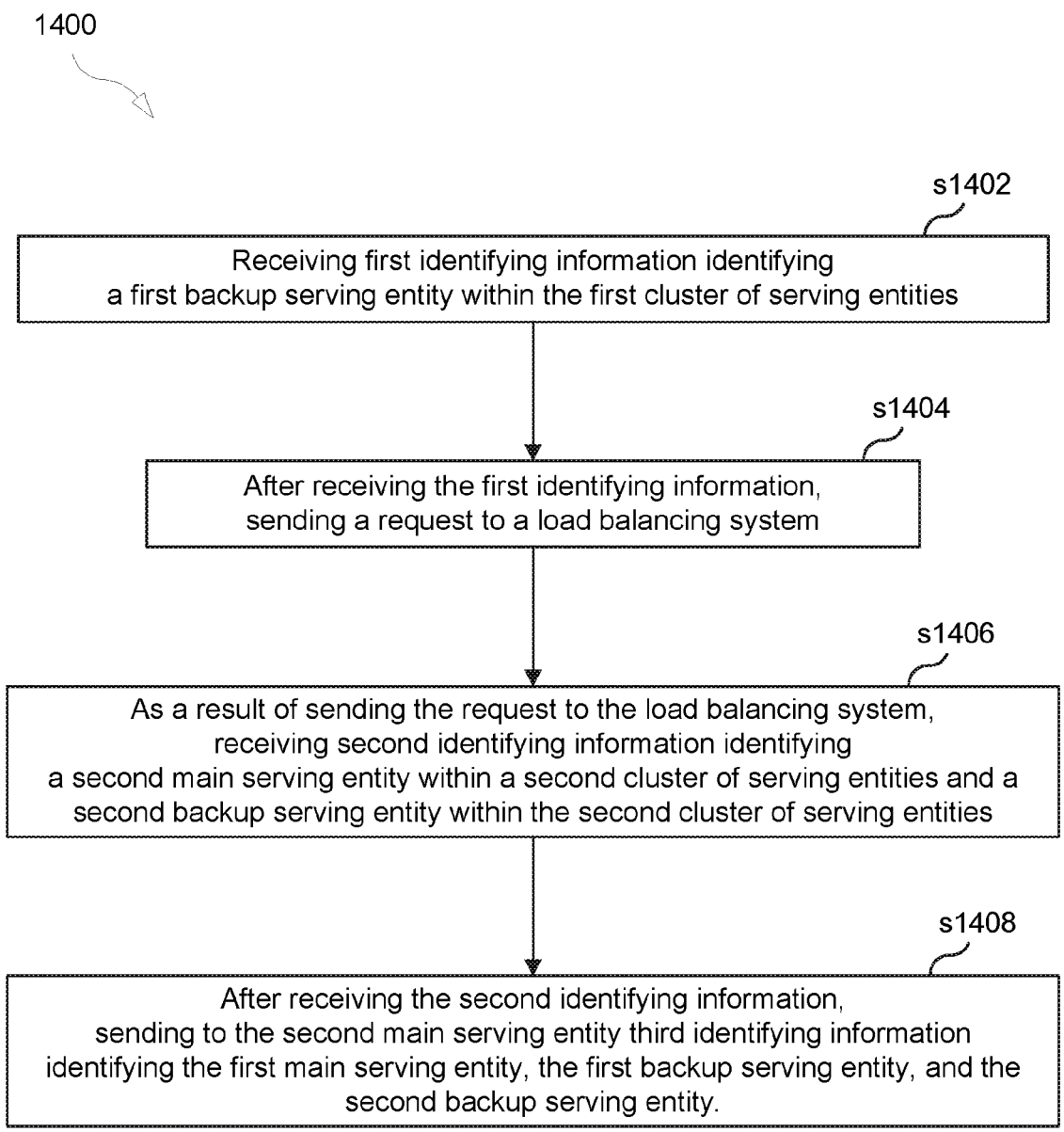
FIG. 14 is a flow chart illustrating a process according to some embodiments.

FIG. 14 is a flow chart illustrating a process 1400 according to an embodiment. Process 1400 may be performed by a first main serving entity within a first cluster of serving entities. Process 1400 may begin in step s1402.

Step s1402 comprises receiving first identifying information identifying a first backup serving entity within the first cluster of serving entities. In some embodiments, the first identifying information may be sent by a client.

Step s1404 comprises after receiving the first identifying information, sending a request to a load balancing system.

Step s1406 comprises as a result of sending the request to the load balancing system, receiving second identifying information identifying a second main serving entity within a second cluster of serving entities and a second backup serving entity within the second cluster of serving entities. In some embodiments, the second identifying information may be sent by the load balancing system.

Step s1408 comprises after receiving the second identifying information, sending to the second main serving entity third identifying information identifying the first main serving entity, the first backup serving entity, and the second backup serving entity.

In some embodiments, process 1400 further includes sending to the first backup serving entity information identifying the client, the second main serving entity, and the second backup serving entity.

In some embodiments, process 1400 further includes receiving a service request sent by the client, setting up session data, and sending the session data to the first backup serving entity.

In some embodiments, process 1400 further includes receiving unavailability information indicating that the second main serving entity is unavailable. The unavailability information may be sent from the load balancing system. Process 1400 may further include as a result of receiving the unavailability information, sending a session request to the second backup serving entity.

In some embodiments, process 1400 further includes receiving unavailability information indicating that the second backup serving entity is unavailable and replacing the second backup serving entity with the additional backup serving entity. The unavailability information may be sent by the load balancing system and the unavailability information may further include information identifying an additional backup serving entity. In some embodiments, the additional backup serving entity may be selected from the second cluster of serving entities.

In some embodiments, when the first main serving entity and/or the first backup serving entity starts up or shuts down, information corresponding to the first main serving entity and/or the first backup serving entity stored in a service registry may be updated.

Figure 15:
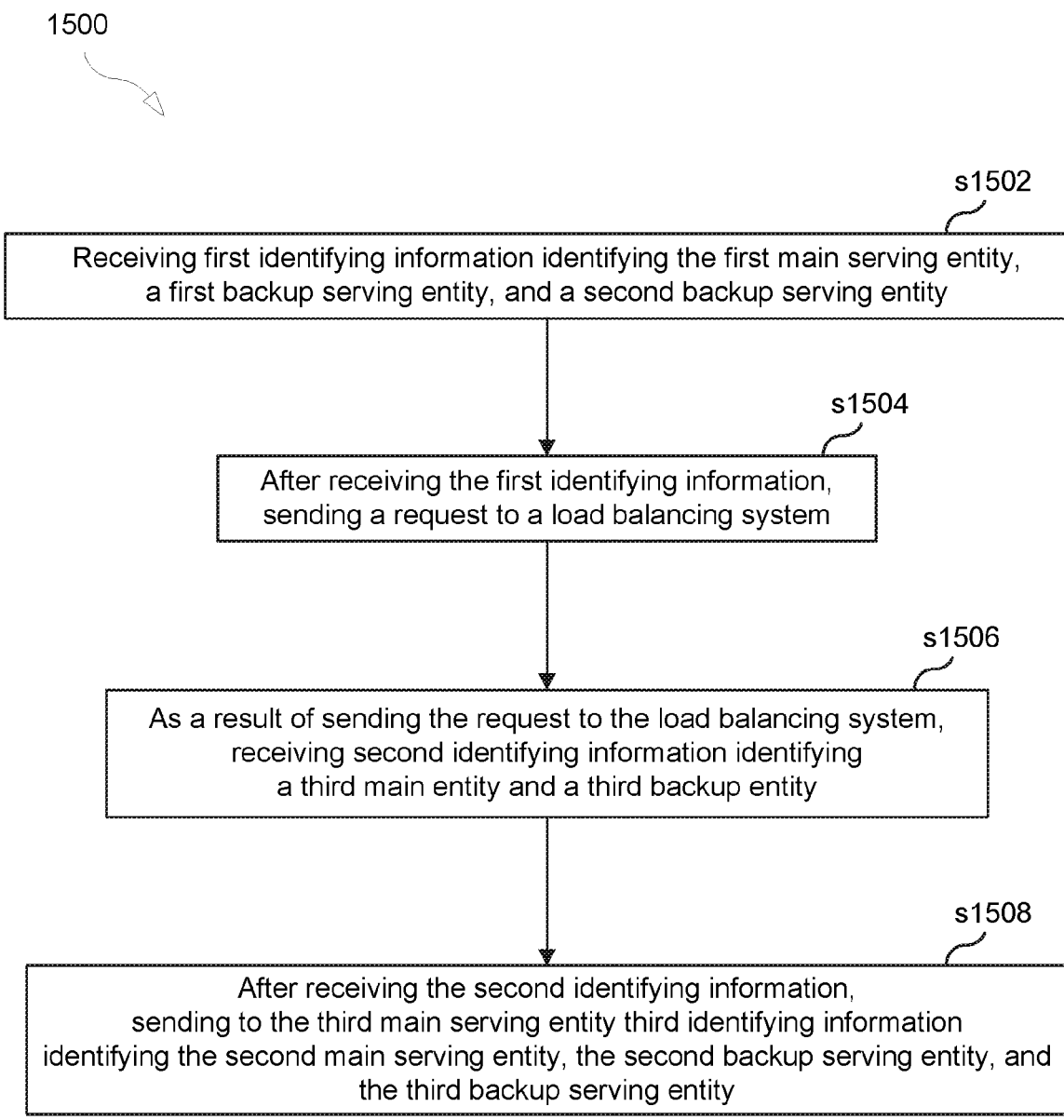
FIG. 15 is a flow chart illustrating a process according to some embodiments.

FIG. 15 is a flow chart illustrating a process 1500 according to an embodiment. Process 1500 may be performed by a second main serving entity. Process 1500 may begin in step s1502.

Step s1502 comprises receiving first identifying information identifying the first main serving entity, a first backup serving entity, and a second backup serving entity. In some embodiments, the first identifying information may be sent by a first main serving entity.

Step s1504 comprises after receiving the first identifying information, sending a request to a load balancing system.

Step s1506 comprises as a result of sending the request to the load balancing system, receiving second identifying information identifying a third main entity and a third backup entity. In some embodiments, the second identifying information may be sent by the load balancing system.

Step s1508 comprises after receiving the second identifying information, sending to the third main serving entity third identifying information identifying the second main serving entity, the second backup serving entity, and the third backup serving entity.

In some embodiments, each of the first main serving entity and the first backup serving entity is selected from a first cluster of serving entities, each of the second main serving entity and the second backup serving entity is selected from a second cluster of serving entities, and each of the third main serving entity and the third backup serving entity is selected from a third cluster of serving entities.

In some embodiments, process 1500 further comprises sending to the second backup serving entity information identifying the first main serving entity, the first backup serving entity, the third main serving entity, and the third backup serving entity.

In some embodiments, process 1500 further comprises receiving a session request sent by the first main serving entity, setting up session data, and sending the session data to the second backup serving entity.

In some embodiments, process 1500 further comprises receiving unavailability information indicating that the first main serving entity or the third main serving entity is unavailable. The unavailability information may be sent by the load balancing system.

Process 1500 may further comprise if the unavailability information indicates that the first main serving entity is unavailable, as a result of receiving the unavailability information, sending a session response to the first backup serving entity and if the unavailability information indicates that the third main serving entity is unavailable, as a result of receiving the unavailability information, sending a session request to the third backup serving entity.

In some embodiments, process 1500 further comprises receiving unavailability information indicating that the first backup serving entity, the second backup serving entity, or the third backup serving entity is unavailable. The unavailability information may be sent by the load balancing system and the unavailability information may further include information identifying an additional backup serving entity.

Process 1500 may further comprise if the unavailability information indicates that the first backup serving entity is unavailable, replacing the first backup serving entity with the additional backup serving entity. The additional backup serving entity may be selected from the first cluster of serving entities.

Process 1500 may further comprise if the unavailability information indicates that the second backup serving entity is unavailable, replacing the second backup serving entity with the additional backup serving entity. The additional backup serving entity may be selected from the second cluster of serving entities.

Process 1500 may further comprise if the unavailability information indicates that the third backup serving entity is unavailable, replacing the third backup serving entity with the additional backup serving entity. The additional backup serving entity may be selected from the third cluster of serving entities.

In some embodiments, process 1500 further comprises if the unavailability information indicates that the second backup serving entity is unavailable, sending to the additional backup serving entity information identifying the first main serving entity, the first backup serving entity, the third main serving entity, and the third backup serving entity.

In some embodiments, after the second main serving entity becomes unavailable, the second backup serving entity is configured to receive unavailability information (a) indicating that the second backup serving entity is unavailable and (b) including information identifying an additional backup serving entity.

In some embodiments, the first main serving entity, the first backup serving entity, the third main serving entity, and the third backup serving entity are configured to be updated such that the second backup serving entity becomes a new main serving entity in the second cluster of serving entities.

In some embodiments, the second backup serving entity is configured to send to the additional backup serving entity information identifying the first main serving entity, the first backup serving entity, the third main serving entity, and the third backup serving entity.

In some embodiments, all entities in the first cluster are capable of performing the same function.

In some embodiments, all entities in the first cluster are capable of performing the first function and all entities in the second cluster are capable of performing the second function. The first function and the second function may be different.

Figure 16:
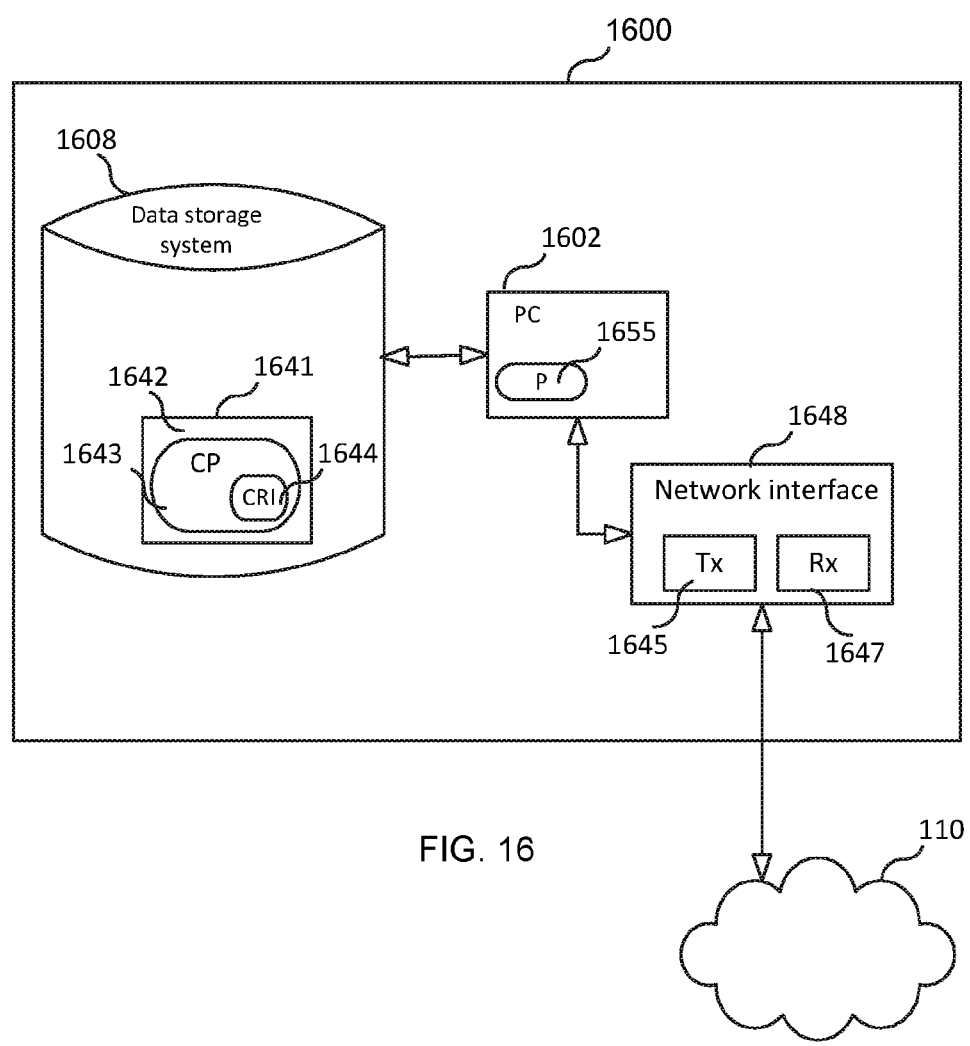
FIG. 16 is a block diagram illustrating an apparatus according to some embodiments.

FIG. 16 is a block diagram of an apparatus 1600, according to some embodiments, for implementing load balancing system 102, client 152, or any serving entity including first main serving entity 154 and second main serving entity 158. As shown in FIG. 16, apparatus 1600 may comprise: processing circuitry (PC) 1602, which may include one or more processors (P) 1655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1600 may be a distributed computing apparatus); a network interface 1648 comprising a transmitter (Tx) 1645 and a receiver (Rx) 1647 for enabling apparatus 1600 to transmit data to and receive data from other nodes connected to a network 110 (e.g., an Internet Protocol (IP) network) to which network interface 1648 is connected; and a local storage unit (a.k.a., "data storage system") 1608, which may include one or more non-volatile storage devices and/or one or more volatile storage devices. In embodiments where PC 1602 includes a programmable processor, a computer program product (CPP) 1641 may be provided. CPP 1641 includes a computer readable medium (CRM) 1642 storing a computer program (CP) 1643 comprising computer readable instructions (CRI) 1644. CRM 1642 may be a non-transitory computer readable medium, such as, magnetic media (e.g., a hard disk), optical media, memory devices (e.g., random access memory, flash memory), and the like. In some embodiments, the CRI 1644 of computer program 1643 is configured such that when executed by PC 1602, the CRI causes apparatus 1600 to perform steps described herein (e.g., steps described herein with reference to the flow charts and message flow diagrams described herein). In other embodiments, apparatus 1600 may be configured to perform steps described herein without the need for code. That is, for example, PC 1602 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is implicit that a step must follow or precede another step.

The invention claimed is:

1. A method performed by a load balancing system, the method comprising:
    receiving a request sent by a client;
    selecting from a first cluster of serving entities a first main serving entity and a first backup serving entity;
    as a result of receiving the request sent by the client, sending to the client information identifying the selected first main serving entity and the selected first backup serving entity;
    after sending to the client the information identifying the selected first main serving entity and the selected first backup serving entity, receiving a request sent by the first main serving entity;
    selecting from a second cluster of serving entities a second main serving entity and a second backup serving entity; and
    as a result of receiving the request sent by the first main serving entity, sending to the first main serving entity information identifying the selected second main serving entity and the selected second backup serving entity.

2. The method of claim 1, further comprising:
obtaining unavailability information indicating that the first main serving entity or the first backup serving entity is unavailable; and
as a result of obtaining the unavailability information, sending to one or more entities information indicating that the first main serving entity or the first backup serving entity is unavailable.

3. The method of claim 2, further comprising:
as a result of obtaining the unavailability information, selecting an additional backup serving entity from the first cluster of serving entities; and
sending to said one or more entities information identifying the selected additional backup serving entity.

4. The method of claim 1, wherein the load balancing system is either centralized or distributed.

5. The method of claim 1, further comprising:
obtaining from a service registry information regarding all entities in the first cluster of serving entities, wherein the first cluster of serving entities is associated with one or more particular types of service.

6. The method of claim 1, wherein all entities in the first cluster are capable of performing a same function.

7. The method of claim 1, wherein
all serving entities in the first cluster are capable of performing a first function,
all serving entities in the second cluster are capable of performing a second function, and
the first function and the second function are different.

8. A non-transitory computer readable medium storing a computer program comprising instructions which, when executed on at least one processor, cause the at least one processor to carry out the method of claim 1.

9. A method performed by a client, the method comprising:
sending a request to a load balancing system;
as a result of sending the request to the load balancing system, receiving a first message identifying a first main serving entity that is a part of a first cluster of serving entities and a first backup serving entity that is a part of the first cluster of serving entities, wherein the first message was sent by the load balancing system, and further wherein the first message indicates that the first main serving entity is a main serving entity for a session and the first backup serving entity is a backup serving entity for the session; and
after receiving the first message identifying the first main serving entity and the first backup serving entity, sending to the first main serving entity a second message identifying the first backup serving entity, wherein the second message indicates that the first backup serving entity is a backup serving entity for the session.

10. The method of claim 9, further comprising:
determining whether a connection to the first main serving entity and/or a connection to the first backup serving entity exists;
as a result of determining that the connection to the first main serving entity does not exist, setting up the connection to the first main serving entity; and
as a result of determining that the connection to the first backup serving entity does not exist, setting up the connection to the first backup serving entity.

11. The method of claim 9, wherein the second message is for triggering the first main serving entity to send towards the first backup serving entity session data indicating the session.

12. A non-transitory computer readable medium storing a computer program comprising instructions which, when executed on at least one processor, cause the at least one processor to carry out the method of claim 9.

13. A load balancing system comprising:
processing circuitry; and
a memory containing instructions executable by the processing circuitry, wherein the load balancing system is configured to:
receive a request sent by a client;
select from a first cluster of serving entities a first main serving entity and a first backup serving entity;
as a result of receiving the request sent by the client, send to the client information identifying the selected first main serving entity and the selected first backup serving entity;
after sending to the client the information identifying the selected first main serving entity and the selected first backup serving entity, receive a request sent by the first main serving entity;
select from a second cluster of serving entities a second main serving entity and a second backup serving entity; and
as a result of receiving the request sent by the first main serving entity, send to the first main serving entity information identifying the selected second main serving entity and the selected second backup serving entity.

14. A client comprising:
processing circuitry; and
a memory containing instructions executable by the processing circuitry, wherein the client is configured to:
send a request to a load balancing system;
as a result of sending the request to the load balancing system, receive a first message identifying a first main serving entity that is a part of a first cluster of serving entities and a first backup serving entity that is a part of the first cluster of serving entities, wherein the first message was sent by the load balancing system, and further wherein the first message indicates that the first main serving entity is a main serving entity for a session and the first backup serving entity is a backup serving entity for the session; and
after receiving the first message identifying the first main serving entity and the first backup serving entity, send to the first main serving entity a second message identifying the first backup serving entity, wherein the second message indicates that the first backup serving entity is a backup serving entity for the session.

15. The client of claim 14, wherein the second message is for triggering the first main serving entity to send towards the first backup serving entity session data indicating the session.

* * * * *